United States Patent [19]

Sasaki et al.

[11] Patent Number: 5,325,585
[45] Date of Patent: Jul. 5, 1994

[54] METHOD FOR THE ASSEMBLY OF A SUN ROOF OF AN AUTOMOTIVE VEHICLE

[75] Inventors: Katsuaki Sasaki; Tomonori Otsubo; Tomoo Taguchi; Yoshihiro Konno; Yasukazu Watanabe; Shigefumi Kohno, all of Hiroshima, Japan

[73] Assignee: Mazda Motor Corporation, Hiroshima, Japan

[21] Appl. No.: 940,385

[22] Filed: Sep. 3, 1992

[30] Foreign Application Priority Data

Sep. 5, 1991 [JP] Japan ................. 3-254643
Sep. 5, 1991 [JP] Japan ................. 3-254644
Sep. 30, 1991 [JP] Japan ................. 3-278566

[51] Int. Cl.⁵ .......................... B23P 17/00; B60J 7/08
[52] U.S. Cl. .............................. 29/897.2; 29/401.1; 29/423; 29/464; 29/466; 29/468; 296/216; 296/221; 296/224
[58] Field of Search ................. 29/401.1, 423, 464, 29/466, 467, 468, 469, 559, 897.2; 296/216, 221, 222, 223, 224

[56] References Cited

U.S. PATENT DOCUMENTS

| | | | |
|---|---|---|---|
| 4,332,416 | 6/1982 | Lutz et al. | 296/221 X |
| 4,375,716 | 3/1983 | Armstrong et al. | 29/464 X |
| 4,553,307 | 11/1985 | Kaltz et al. | 29/401.1 |
| 4,601,091 | 7/1986 | Grimm et al. | 29/464 X |
| 4,749,227 | 6/1988 | Bienert et al. | 296/221 |
| 4,898,016 | 2/1990 | Moeller et al. | 29/401.1 X |

FOREIGN PATENT DOCUMENTS 62-286830 12/1987 Japan.
3-54025 3/1991 Japan.

Primary Examiner—Mark Rosenbaum
Assistant Examiner—S. Thomas Hughes
Attorney, Agent, or Firm—Fish & Richardson

[57] ABSTRACT

The front portion of a roof panel has left-hand and right-hand roof opening sections, each roof opening section being wide open without a roof side rail on its transversely outer side. A movable roof member is mounted on the roof opening sections so as to be movable longitudinally through a base frame fixed to the body of a vehicle, thereby opening the roof opening sections when the movable roof member is moved in its rear position and closing it when it is moved in its front position. The base frame contains a front section to be mounted to a front header of the body, a rear section to be mounted to a front edge portion of a rear roof panel section, a middle section for connecting middle portions of the front section and the rear section, and a guide section extending rearward from a transversely outer side portion of the rear section. The base frame is fixed to the body in such a state that the portions of the base frame or the body where the alignment position is likely to deviate from its normal position are aligned with an aligning jig or the movable roof member. Further, an alignment section or member is formed each on the body side and the base frame side so as to assume a normal positional relationship.

16 Claims, 20 Drawing Sheets

METHOD FOR THE ASSEMBLY OF A SUN ROOF OF AN AUTOMOTIVE VEHICLE

BACKGROUND OF THE INVENTION

1. Field of the Invention

This invention relates to a structure of a sun roof of an automotive vehicle and a method of the assembly thereof.

2. Description of the Related Art

There is an increasing demand of an automobile with an opening formed in a roof panel and for the roof opening structured so as to be opened and closed with a movable roof member.

The opening to be formed in the roof panel of the automobile may be structured in such a manner that, as disclosed in Japanese Patent Laid-open Publication (kokai) No. 2-306,821, a pair of left-hand and right-hand front roof opening sections are provided in the front portion of the roof panel. Each of the left-hand and right-hand roof opening sections is open to its entire length at its transversely outer portions, that is, at its left-hand and right-hand outer side ends, respectively. It is closed at its front and rear edge portions and a transversely inner edge portion extending longitudinally (from front to back) so as to connect its front edge portion to its rear edge portion. The left-hand and right-hand front roof opening sections are configured each in a fashion such that a front edge portion of the roof opening section is composed of a front header, a rear edge portion thereof is composed of the front edge portion of a rear roof panel section, and a transversely inner edge .portion extending longitudinally is composed of a connecting middle section that connects the front header with the rear roof panel section. This type of the roof opening may be called a T-bar roof, and it can provide the .passenger with an open feeling that resembles the feeling given by an open car because the left-hand and right-hand outer side ends of the roof panel can be opened.

The left-hand and right-hand front roof opening sections are opened or closed with detachable left-hand and right-hand roof sections, respectively, in many occasions. They are also designed to be opened or closed simultaneously with one sheet of a movable roof member that has a size substantially large enough to cover a pair of the left-hand and right-hand front roof opening sections and that is structured so as to be movable in a longitudinal direction of the vehicle, i.e. in forward and rearward directions.

In the latter case, that is, when .the left-hand and right-hand front roof opening sections are to be opened or closed simultaneously with one sheet of the movable roof member, the movable roof member should be guided in the forward or rearward direction. At this end, a base frame may be fixed to a body of the vehicle and a guide.mechanism may be disposed in a position between the base frame and the movable roof member.

Although the base frame may assume a variety of forms, it is desired from the point of view of ensuring a strength of mounting and the like that the base frame comprises a front base frame section extending over the substantially entire length along and parallel to the front header, a rear base frame section extending over the substantially entire length along and parallel to the rear edge portion of the rear roof panel section, and a middle base frame section extending longitudinally and connecting a middle portion of the front base frame section with a middle portion of the rear base frame section. The arrangement for this structure is preferred in terms of ensuring a wide area for mounting the base frame to the body of the vehicle and ensuring a large number of positions for fixing the base frame to the body thereof because the base frame can be fixed tightly to the body. For this structure, the guide mechanism for the movable roof member may be configured by taking advantage of the middle portion of the base frame.

On the other hand, when the guide mechanism for the movable roof member is to be disposed on the rear side of the body of the vehicle, the base frame may be structured in such a shape as having a pair of left-hand and right-hand guide sections, each extending from a transversely outer end portion of the rear base frame section toward the rear.

From the description as have been described hereinabove, the base frame may be configured in such a manner that it comprises the front base frame section, the rear base frame section, and the middle base frame section, or the front base frame section, the rear base frame section, the middle base frame section, and the left-hand and right-hand guide sections.

The automotive vehicle having a pair of left-hand and right-hand roof opening sections is provided with no roof side rail at their transversely outer edge portions. This leads to the fact that the transversely outer end portions of the front header, that is, an upper end portion of a front pillar, may deviate from its normal position.

On the other hand, since the front base frame section of the base frame is of such a cantilever type as being free at the transversely outer end portions, the transversely outer end portions of the front base frame section are likely to deviate from their normal positions.

Likewise, the left-hand and right-hand guide sections of the base frame are likely to deviate from their normal positions.

As have been described hereinabove, the deviation in the positions is likely to occur on the side of the body of the vehicle as well as on the side of the base frame, so that the mere fixing of the base frame to the body may deviate from their normal positions, thereby failing to guide the movable roof member smoothly. Further, if the movable roof member would be closed in a deviated state, a problem with sealing may arise.

SUMMARY OF THE INVENTION

An object of this invention is to provide a structure of a sun roof for an automotive vehicle and a method for the assembly of the sun roof adapted for the base frame to be mounted to the body of the vehicle in a normal mounting relationship with high accuracy.

In order to achieve the object as described hereinabove, this invention is so adapted as to fix the base frame to the body of the vehicle with the aid of an alignment means in such a state that the base frame is aligned with respect to the body with high accuracy.

The base frame is aligned with respect to the body of the vehicle in such a manner that the portion likely to deviate from its normal position is aligned with the aid of an aligning jig. The aligning jig may be selectively mounted to either of the body of the vehicle or the base frame. As a matter of course, the aligning jig is detached after the base frame has been fixed to the body.

In addition to the aligning jig, both the body of the vehicle and the base frame may be provided with aligning portions or members that are adapted to engage with each other, thereby allowing the base frame and the body to assume their normal mounting arrangement. The aligning portions or members may be formed to be detachable from the base frame and/or the body after the base frame has been fixed to the body or left undetached from the base frame and/or the body to avoid any interference with the base frame and/or the body.

Furthermore, the aligning jig or the aligning portion or member may be configured by taking advantage of the movable roof member.

The specific configuration of the invention will become apparent from the "Detailed Description of the Invention", and the appended claims, with reference to the accompanying drawings.

The invention permits the base frame to be mounted tightly to the body of the vehicle in its normal position with high accuracy, thereby ensuring a smooth movement of the movable roof member and providing a tight seal when the movable roof member is closed.

Other objects, features and advantages of the present invention will become apparent and obvious in the course of the description of the preferred embodiments which follows, with reference to the accompanying drawings.

DETAILED DESCRIPTION OF THE INVENTION

This invention is described in more detail with reference to the accompanying drawings. First, the description is directed to the structure of the sun roof as a whole, and then the description is directed to the method for the assembly of the sun roof.

Figure 1:
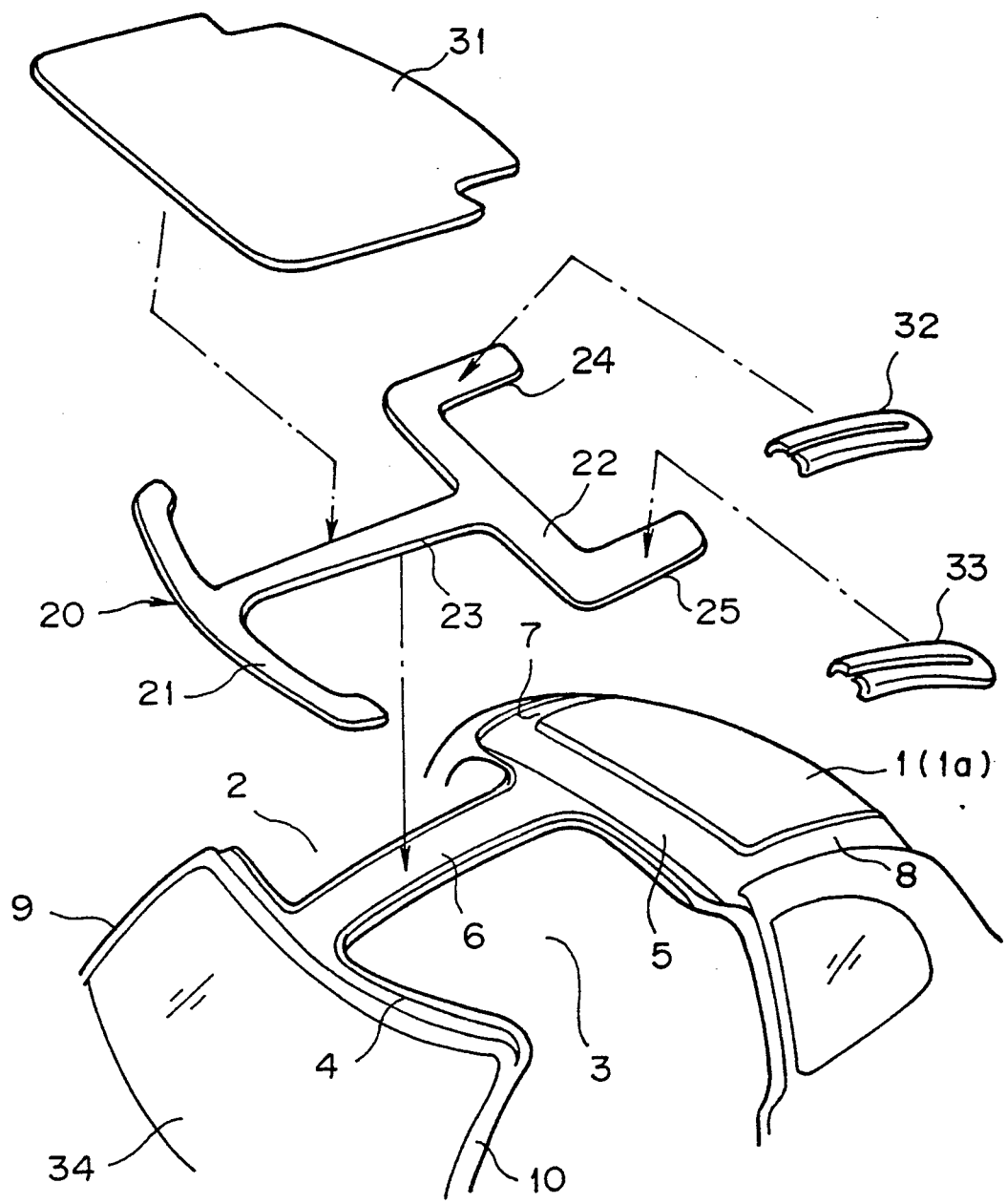
FIG. 1 is an enlarged view showing a sun roof section of an automotive vehicle.

As shown in FIG. 1, a roof panel 1 is provided at its front portion with a pair of left-hand and right-hand roof opening sections 2 and 3, respectively, which in turn are so designed as to be wide open to their entire lengths, without roof side rails disposed at their transversely outer side ends, that is, at the left-hand and right-hand outer side edges. A front peripheral edge portion of each of the roof opening sections 2 and 3 is composed of a front header 4, a rear peripheral edge portion thereof is composed of a front edge portion 5 of a rear roof panel section 1a, and a transversely inner side edge portion thereof is composed of a connecting middle section 6 of the roof panel 1. The connecting middle section 6 is adapted to connect the transversely middle portion of the front header 4 with the transversely middle portion of the front edge portion 5 of the rear roof panel section 1a.

As specifically shown in FIG. 1, the upper end portions of front pillars 9 and 10 are connected with the front header 4 yet without any roof side rails mounted thereto, so that the upper end portions of the front pillars 9 and 10 are likely to deviate from their normal positions.

As the front header 4, the front edge portion 5 of the rear roof panel section 1a, and the connecting middle portion 6 of the roof panel 1 provide the surfaces on which a base frame 20 is mounted, they are disposed in a height lower by a predetermined distance than a predetermined height of the roof panel 1 so that the predetermined distance is wide enough to mount and accommodate the base frame 20. The rear roof panel section 1a is provided with left-hand and right-hand mounting surfaces 7 and 8 for mounting a guide section of the base frame 20, which extend continuously from the front edge portion 5 and which are arranged in a height somewhat lower than the predetermined height of the roof panel 1 so as to allow the guide sections of the base frame 20 to be mounted thereon and accommodated therein.

The base frame 20 may comprise an integral combination of a front base frame section 21, a rear base frame section 22, a middle base frame section 23, and a pair of left-hand and right-hand guide sections 24 and 25. The front base frame section 21 is fixed to and on the front header 4 so that it has substantially the same length as the front header 4 or it extends transversely over the substantially entire length of the front header 4. Further, the rear base frame section 22 is mounted to and on the front edge portion 5 of the rear roof panel section 1a, so that it has substantially the same length as the front edge portion 5 or it extends transversely over the substantially entire length of the front edge portion 5. In addition, as the middle base frame section 23 is mounted to and on the connecting middle portion 6 of the roof panel 1, it is disposed in a transversely middle portion extending longitudinally, or in forward and rearward directions, so as to connect a transversely middle portion of the front base frame section 21 with a transversely middle portion of the rear base frame section 22. Furthermore, the left-hand and right-hand guide sections 24 and 25 are disposed extending continuously rearward from the transversely outer end portions of the rear base frame section 22, or from the left-hand and right-hand side end portions of the rear base frame section 22, and they are mounted to and on the mounting surfaces 7 and 8 of the roof panel 1, respectively.

As the transversely outer end portions of the front base frame section 21 and the rear end portions of the guide sections 24 and 25 are free end portions, they are likely to deviate from their original positions.

As shown in FIG. 1, a movable roof member 31 is so arranged as to simultaneously open or close the left-hand and right-hand roof opening sections 2 and 3, so that it is sized large enough to cover both of the left-hand and right-hand roof opening sections 2 and 3. The movable roof member 31 has substantially the same transverse width as the transverse width of the roof panel 1 at the portions of the roof opening sections 2 and 3 and it has substantially the same longitudinal length as the distance interposed between the front header 4 and the front edge portion 5 of the rear roof panel section 1a.

Figure 2:
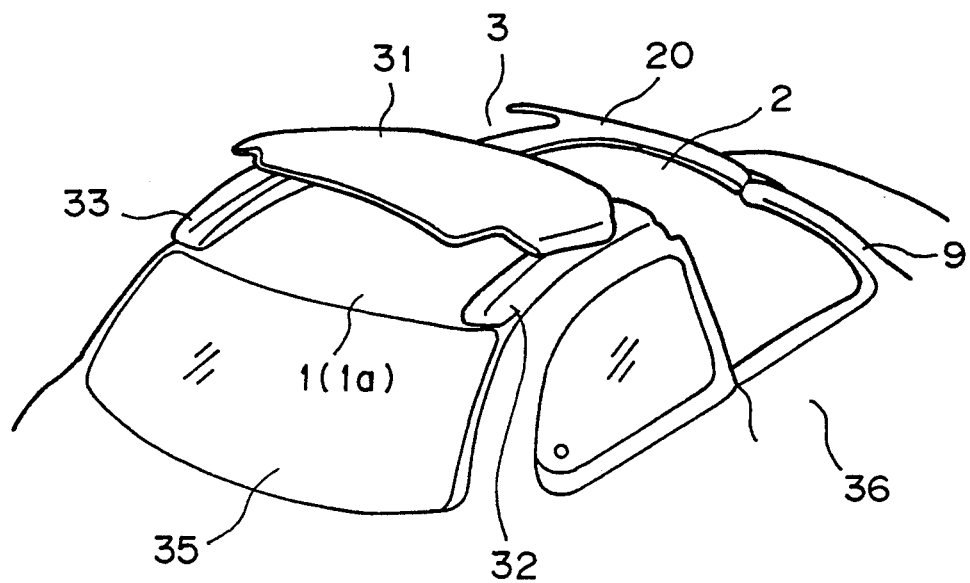
FIG. 2 is a perspective view of a movable roof member in its open state.
Figure 3:
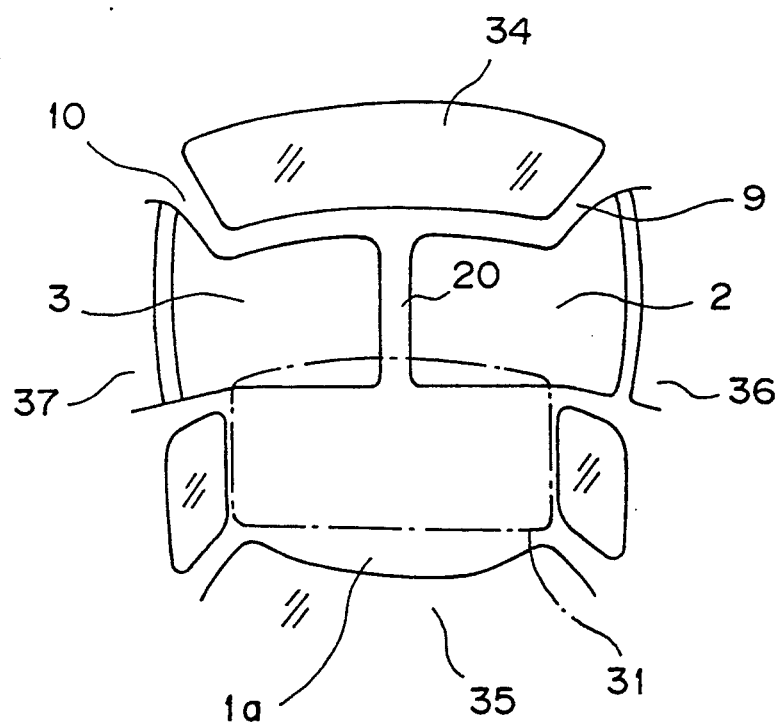
FIG. 3 is a schematic top view of FIG. 2.
Figure 4:
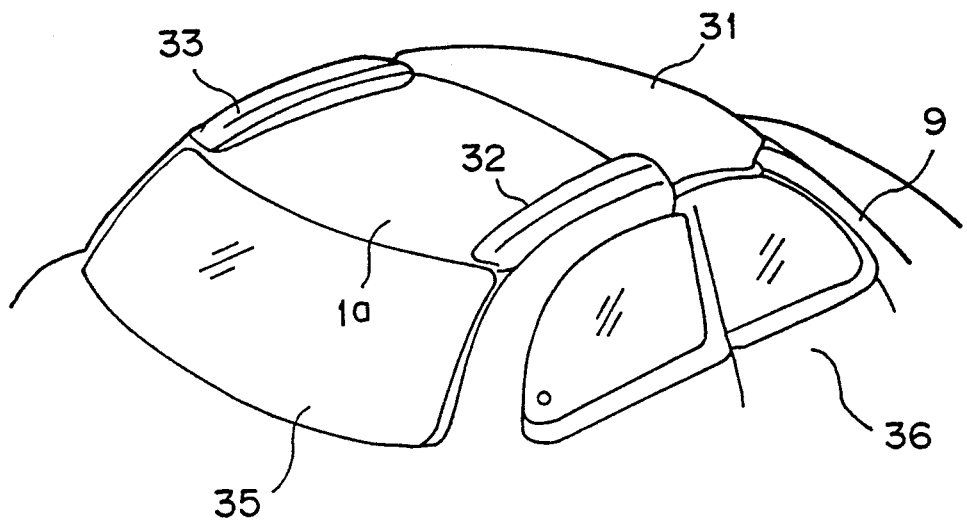
FIG. 4 is a perspective view showing the movable roof member in its closed state.
Figure 5:
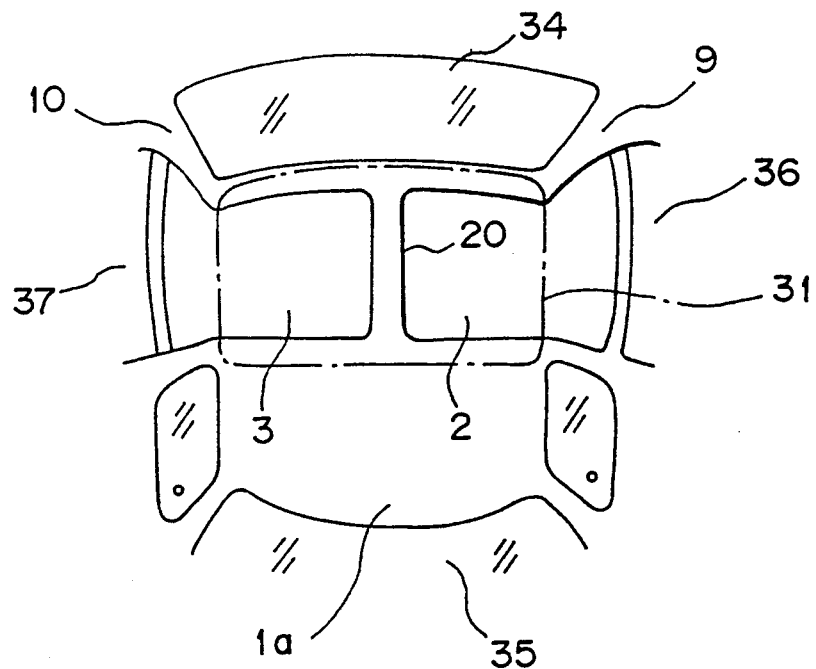
FIG. 5 is a schematic top view of FIG. 4.

The movable roof member 31 is mounted to and on the body of the vehicle so as to be movable in a longitudinal direction of the body, that is, in forward and rearward directions, with the aid of the base frame 20, in a manner as will be described hereinafter. When the movable roof member 31 is moved rearward, on the one hand, the left-hand and right-hand roof opening sections 2 and are opened simultaneously as shown in FIGS. 2 and 3. When the movable roof member 31 is moved forward, on the other hand, the left-hand and right-hand roof opening sections 2 and 3 are covered and closed simultaneously with the movable roof member 31 as shown in FIGS. 4 and As shown in FIGS. 1 to 5, inclusive, reference numerals 32 and 33 stand for coverings for the guide sections 24 and 25; reference numeral 34 stands for a front window panel; reference numeral 35 stands for a rear window panel; and reference numerals 36 and 37 stand for side doors.

Figure 6:
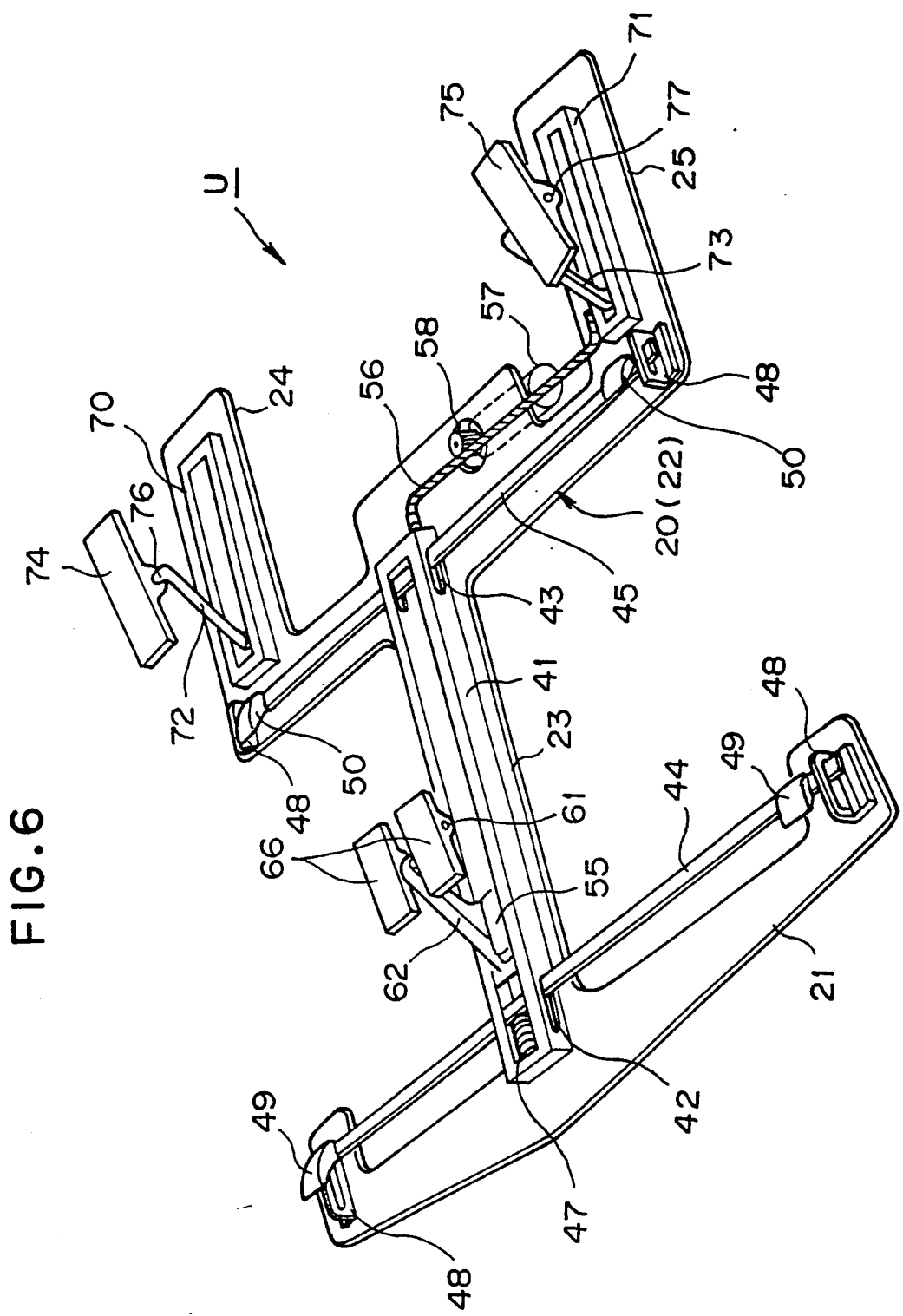
FIG. 6 is a perspective view showing a unit body in which a variety of mechanisms are assembled with a base frame.

FIG. 6 shows a unit body U in which a guide mechanism for the movable roof member 31 and the like are assembled with the base frame 20. It is noted in the description which follows that, since there is no need to distinguish the base frame 20 from the unit body U, they may be described without distinction of the base frame 20 from the unit body U.

To the middle section 23 of the base frame 20 is fixed a guide frame 41 so as to form a closed section in association with the middle section 23. A front end portion of the guide frame 41 extends to the front base frame section 21 of the base frame 20 and a rear end portion thereof extends to the rear base frame section 22 thereof, thereby reinforcing the base frame 20.

Figure 7:
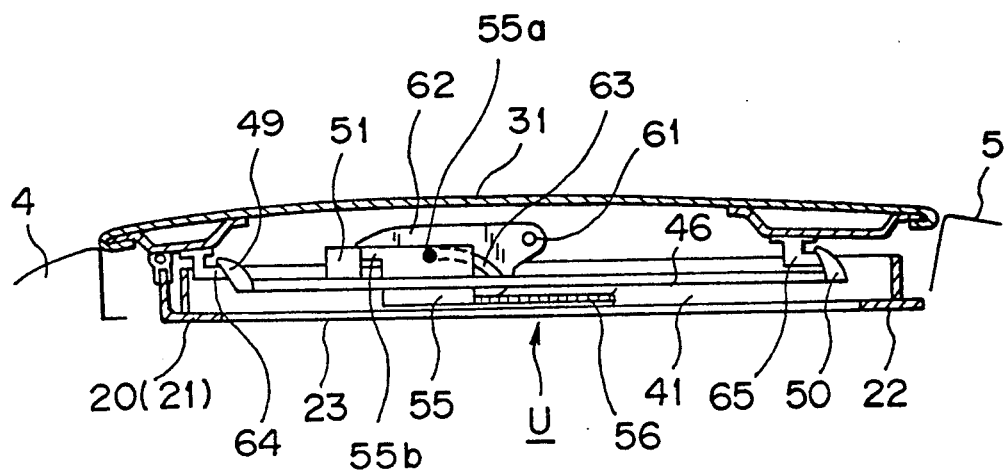
FIG. 7 is a cross-sectional side view showing the movable roof member in its closed state.
Figure 8:
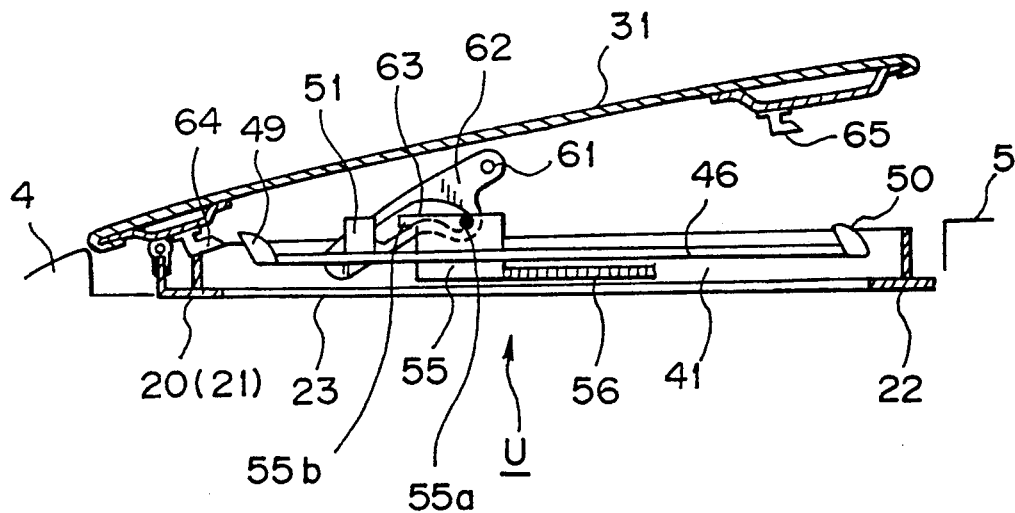
FIG. 8 is a cross-sectional side view showing the movable roof member in a tilted state.

The guide frame 41 is provided at its front and rear end portions with guide holes 42 and 43, respectively, each extending in a short distance in a longitudinal direction of the body. The guide holes 42 and 43 are adapted to allow levers 44 and 45, respectively, so as to be slidable longitudinally, or in forward and rearward directions. The levers 44 and 45 are arranged each to extend transversely over the substantially entire length of the corresponding base frame sections, and the lever 44 is so connected with the lever 45 as to be integrally movable with the aid of a connecting lever 46, as shown in FIGS. 7 and 8. An assembly unit consisting of the levers 44, 45 and 46 is constantly biased rearward with a spring 47 mounted in a front end portion of the guide frame 41.

The transversely outer end portions of each of the levers 44 and 45 are held with brackets 48 and are guided so as to be slidable forward or rearward. Further, the transversely outer end portions of the levers 44 and 45 are provided integrally with engaging paws 49 and 50, respectively.

To the connecting lever 46 is fixed a stop block 51 in the guide frame 41, as shown in FIGS. 7 and 8.

As shown in FIGS. 7 and 8, a driving block 55 is disposed within the guide frame 41 so as to be slidable and the driving block 55 is fixed to a front end portion of a driving wire 56 which in turn, as shown in FIG. 6, is engaged with a pinion 58 that can be rotatably driven with a motor 57 in normal and reverse directions, thereby driving the driving block 55 in forward and rearward directions in accordance with with the rotation of the motor 57.

As shown in FIGS. 7 and 8, a side surface of the driving block 55 is projected a pin 55a. At the front side of the driving block 55 is projected a pressing section or member 55b which is so disposed as to be abuttable with the rear surface of the stop block 51.

To the bottom surface of the movable roof member 31 is mounted a lever 62 so as to be slidable in both directions from a pin 61 extending transversely. Further, the movable roof member 31 is provided at its bottom surface with a mounting plate 66, as shown in FIG. 6, which can hold the pin 61. To the pin 61 is mounted a lever 62 to be pivotable about the pin 61. The lever 62 is provided with a cam hole 63 in such a shape as shown in FIGS. 7 and 8, and the pin 55a projected from the side surface of the driving block 55 is so arranged as to be inserted slidably into the cam hole 63.

On the front bottom surface of the movable roof member 31 are integrally formed left-hand and right-hand stop paws 64 corresponding to the engaging paws 49. Likewise, left-hand and right-hand stop paws 65 are integrally formed on the rear bottom surface of the movable roof member 31 so as to correspond to the engaging paws 50. The tapered stop paws 64 are arranged so as to be abuttable with the tapered engaging paws 49, and the tapered stop paws 65 are arranged so as to be abuttable with the tapered engaging paws 50. Hence, when the stop paws 64 and 65 receive a force pressed forward from the engaging paws 49 and 50, respectively, the movable roof member 31 receives a force pressing forward and downward. It can be noted herein that the engaging paws 49, 50 and the stop paws 64, 65 constitute major constituents for a shutting mechanism.

Referring again to FIG. 6, guide frames 70 and 71 are fixed on the upper surfaces of the left-hand and right-hand guide sections 24 and 25 of the base frame 20, respectively. To the guide frames 70 and 71 are mounted levers 72 and 73, respectively, so as to allow their one end portions to be slidably inserted into guide grooves formed in the respective guide frames 70 and 71. The levers 72 and 73 are so arranged as to be slidabley guided smoothly along the guide frames 70 and 71, for example, with the aid of rollers and any other appropriate guiding members.

The other end portions of the levers 72 and 73 are mounted to the movable roof member 31 through mounting plates 74 and 75, respectively, so as to be pivotable about pins as indicated by reference numerals 76 and 77.

The one end portion of the lever 72 or 73, that is, to the portion which can be slid with the guide frame 70 or 71, is connected with the other end portion of the driving wire 56.

A description will be made of the action of the unit body U with reference to the movement of the movable roof member 31.

Referring to FIG. 7, when the movable roof member 31 is closed, the driving block 55 presses the stop block 51 forward and the engaging paws 49 and 50 press the stop paws 64 and 65 forward, respectively, thereby permitting the movable roof member 31 to maintain its closed state tightly with the aid of the forward and downward pressing force.

The driving block 55 is displaced rearward from the closed state of the movable roof member 31 as shown in FIG. 7 by rotating the motor 57 of FIG. 6. The engagement of the engaging paws 49 and 50 with the respective stop paws 64 and 65 is released by the aid of a biasing force of the spring 47 of FIG. 6 in accordance with the rearward movement of the driving block 55.

As the driving block 55 of FIG. 6 moves further rearward, the pin 55a is caused to displace toward a rearward stroke end of the cam hole 62, thereby allowing the lever 63 to pivot about the pin 61 in the counter-clockwise direction in the drawing with respect to the movable roof member 31 and, as a consequence, raising or tilting up the rear end portion of the movable roof member 31. As the pin 55a has reached the rearward stroke end of the cam hole 63, the tilt-up of the movable roof member 31 has been finished in the state as shown in FIG. 8.

When the driving block 55 is displaced further rearward, the movable roof member 31 is allowed to displace rearward in such a state that the movable roof member 31 is tilted up, thereby bringing the left-hand and right-hand roof opening sections 2 and 3 into an open state. As the movable roof member 31 is moving so as to open the roof opening sections 2 and 3, the movable roof member 31 receives the action produced by the guidance of the guide frame 41 with the aid of the lever 62 and the driving block 55 and by the guidance of the guide frames 70 and 71 with the aid of the levers 72 and 73.

When the movable roof member 31 is transferred from its open state to its closed state, the driving block 55 is moved forward in the procedures opposite to the procedures for opening the movable roof member 31. This allows the movable roof member 31 to move from the open state through the state of FIG. 8 to the closed state of FIG. 7.

A description will now be made of operations for fixing the base frame 20 to the body of the vehicle. In the description that follows, the base frame 20 is fixed to the body in such a form of the unit body U as shown in FIG. 6.

Figure 9:
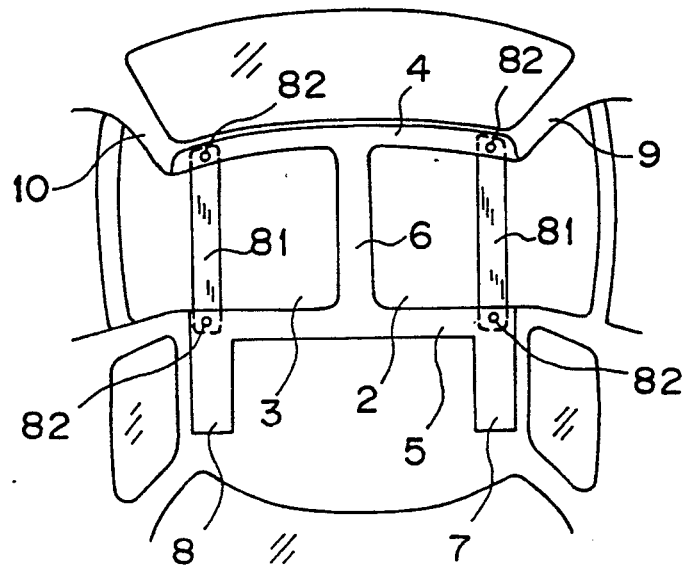
FIG. 9 is a schematic top view showing a body of the vehicle for describing an example in which the left-hand and right-hand outer side end portions of the respective left-hand and right-hand roof opening sections are aligned with each other through aligning jigs.

Referring now to FIG. 9, the alignment with the body of the vehicle is performed with an aligning jig 81 made of a material having a sufficient degree of rigidity. The transversely outer end portions, i.e. the left-hand and right-hand side end portions, of the front header 4 are connected to the transversely outer end portions, i.e. the left-hand and right-hand side end portions, of the front edge portions 5 of the rear roof panel section 1a with left-hand and right-hand aligning jigs 81, respectively. The connection may be performed by taking advantage of a fixing member 82 such as bolts, nuts, and the like. The connection with the aligning jig 81 can set the front pillars 9 and 10 in an accurate positional relationship.

The base frame 20 is then fixed to the body of the vehicle usually with the aligning jigs, such as bolts and nuts. After the base frame 20 has been fixed to the body, the aligning jigs 81 are then detached from the body. The aligning jigs 81 are mounted from the bottom sides of the front header 4 and the front edge portion 5 so as for the base frame 20 to be fixed to the body without interference from the presence of the aligning jigs 81 and for the aligning jigs 81 to be detached from the body without interference with the mounting of the base frame 20.

Although not shown in the drawing, each of the base frame sections 21, 22, 23, 24 and 25 of the base frame 20 is provided with mounting holes through which the base frame 20 is fixed to the body with bolts, nuts or any other appropriate fixing members.

Figure 16:
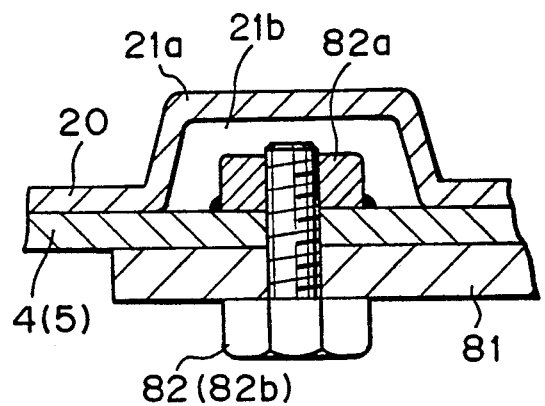
FIG. 16 is a cross-sectional side view showing an example of a portion at which the aligning jig is fixed to the body as shown in FIG. 9.

More specifically, for example, as shown in FIG. 16, a fixing member 82 comprises a nut 82a and a bolt 82b, and the nut 82a may be welded in a predetermined position to the front header 4 or the front edge portion 5 of the rear roof panel section 1a so as to agree with and surround their engaging holes through which the bolt 82 is inserted and then screwed through the nut 82a. If the nut 82a causes an interference with the base frame 20 when it is seated on the body, for example, a projected portion 21a may be formed on the base frame 20 so as to partially project upward and form a concave portion 21b where to cover or accommodate the nut 82a. Alternatively, the base frame 20 may be provided with a partial cut-away aperture corresponding to the nut 82a.

Figure 17:
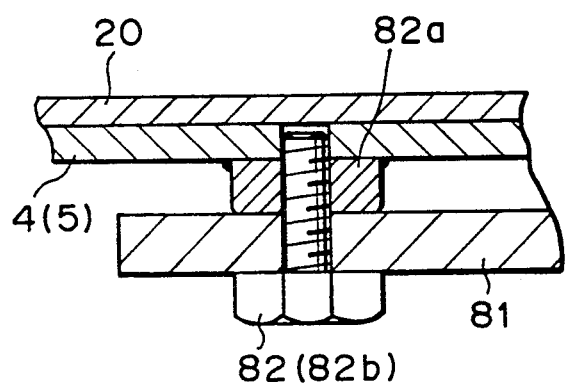
FIG. 17 is a cross-sectional side view showing another example of FIG. 16.

FIG. 17 shows a variant of FIG. 16, where the nut 82a may be welded on the bottom surface of the front header 4 or the front edge portion 5 of the rear roof panel section 1a. In this case, a gap having a thickness somewhat larger than the length of the nut 82a may be formed in the position interposed between the base frame 20 and the front header 4 or the front edge portion 5 thereof.

Turning back to FIG. 10, it is shown that the front base frame section 21 of the base frame 20 is aligned with the rear base frame section 22 with the aid of an aligning jig 83. More specifically, the transversely outer end portions, i.e. the left-hand and right-hand side end portions, of the front base frame section 21 are connected to the transversely outer end portions, i.e. the left-hand and right-hand side end portions, of the rear base frame section 22, respectively, through the aligning jigs 83. The aligning jig 83 is fixed to the base frame 20 with fixing members as indicated by reference numeral 84. The use of the aligning jigs 83 can align the base frame 20 with the roof opening sections 2 and 3 in an accurate shape before fixing the base frame 20 to the body of the vehicle.

The base frame 20 is then fixed to the body in such a state that it is aligned by the aid of the aligning jigs 83, and the aligning jigs 83 are detached from the base frame 20 after having been fixed to the body.

Figure 10:
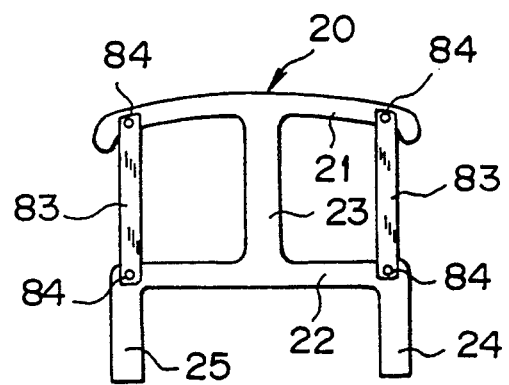
FIG. 10 is a top view showing a base frame indicating an example in which the left-hand and right-hand outer side end portions of the front base frame section are aligned with the respective outer side end portions of the rear base frame section through aligning jigs.
Figure 11:
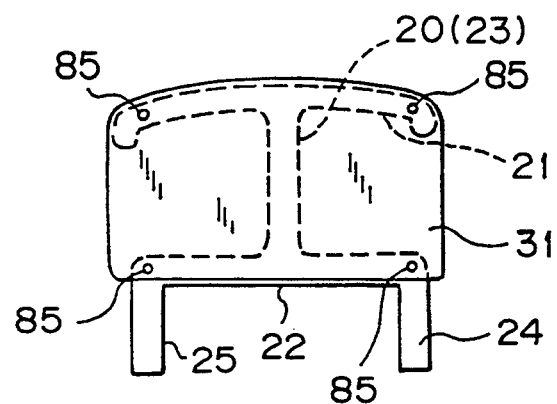
FIG. 11 is a top view showing a base frame indicating an example in which a portion of the base frame is aligned with the aid of the movable roof member.

FIG. 11 shows an example where the movable roof member 31 is utilized as an aligning jig, in place of the aligning jig 83 as shown in FIG. 10, and a fixing jig to be employed for alignment is indicated by reference numeral 85.

As shown in FIG. 11, the base frame 20 is fixed to the body, in such a state that the base frame 20 is aligned with the body by the aid of the movable roof member 31, and the movable roof member 31 is detached from the base frame 20 after the base frame 20 has been fixed to the body.

Figure 12:
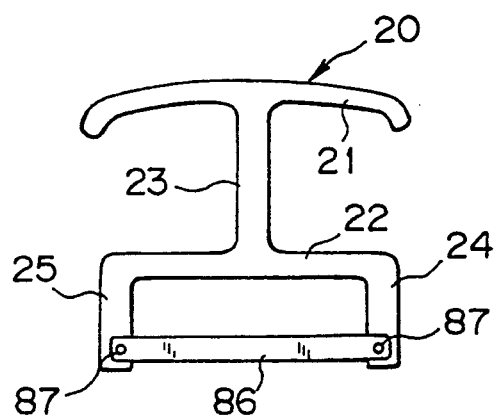
FIG. 12 is a top view showing a base frame indicating an example in which the rearward side end portion of the left-hand guide section of the base frame is aligned with the rear side end portion of the right-hand guide section thereof through an aligning jig.

Further, FIG. 12 shows an example in which the left-hand and right-hand guide sections 24 and 25 are aligned in a normally positional relationship by connecting an end portion of the left-hand guide section 24 to an end portion of the right-hand guide section 25 with an aligning jig 86. This alignment may be performed in addition to the examples as shown in FIGS. 9 to 11. Fixing members for fixing the aligning jig 86 to the guide sections 24 and 25 are indicated by reference numeral 87.

As shown in FIG. 12, the base frame 20 is fixed to the body in such a state that the base frame 20 is aligned with the body by the aid of the aligning jig 86, and the aligning jig 86 is detached from the base frame 20 after the base frame 20 has been fixed to the body.

Figure 13:
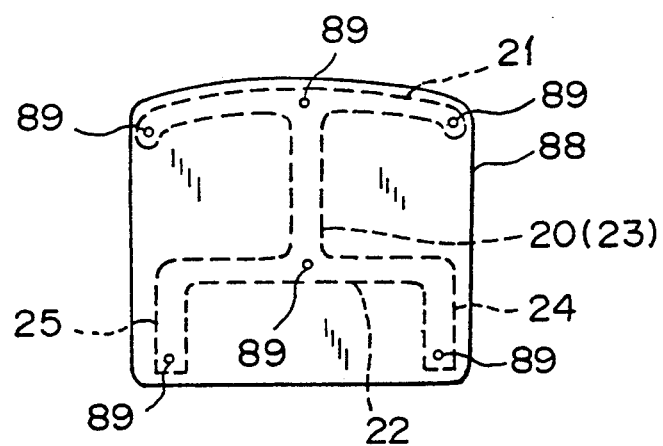
FIG. 13 is a top view showing a base frame indicating an example in which the entire portion of the base frame is t aid of an aligning jig.

The alignment is usually carried out by combining the example as shown in one of FIGS. 9 to 11 with the example as shown in FIG. 12. However, the alignment may be performed with an aligning jig 88 in the form of a plate having a size large enough to cover the entire size of the base frame 20. This mode of alignment is particularly effective in terms of decreasing the number of the aligning jigs and in terms of accuracy in alignment. The use of the aligning jig 88 allows the alignment of the front base frame section 21 with end portions of the guide sections 23 and 24, which are likely to deviate from their normal positions. As shown in FIG. 13, fixing members for the alignment are indicated by reference numerals 89.

As shown in FIG. 13, the base frame 20 is fixed to the body in such a state that the base frame 20 is aligned with the body by the aid of the aligning jig 88, and the aligning jig 88 is detached from the base frame 20 after the base frame 20 has been fixed to the body.

In this case, in order to cause no interference with operations for fixing the base frame 20 to the body of the vehicle, it is preferred, for example, to provide the base frame 20 with an opening having a somewhat large size for inserting a fixing bolt therethrough to fix the base frame 20 to the body. It is further preferred to fix the aligning jig 88 to the base frame 20 from the top in order to allow the aligning jig 88 having a larger size to be detached from the base frame 20 with ease after the base frame 20 has been fixed to the body.

It is preferred, for example, that the aligning jig 88 is provided with an opening having a somewhat larger size, through which a fixing bolt can be inserted therethrough to the body of the vehicle, without causing any inconvenience in the operations for fixing the base frame 20 to the body. Further, it is preferred that the aligning jig 88 is mounted to the base frame 20 from the top in order to readily detach the aligning jig 88 from the base frame 20 in a larger size after the base frame 20 has been fixed to the body.

Furthermore, the aligning jig 88 may preferably be employed in combination with the unit body U which has the base frame 20 assembled in advance, and the unit body U having the aligning jig 88 fixed to the base frame 20 may be conveyed to an assembly line. The aligning jig 88 may preferably be larger in size than the entire size of the base frame 20 in order to prevent foreign materials from attaching to the base frame 20 during conveyance to the assembly line. In other words, an outermost peripheral edge of the aligning jig 88 is at least equal in size or large enough to cover or project outside from an outermost peripheral edge of the base frame 20 in a form of the unit body U.

Figure 14:
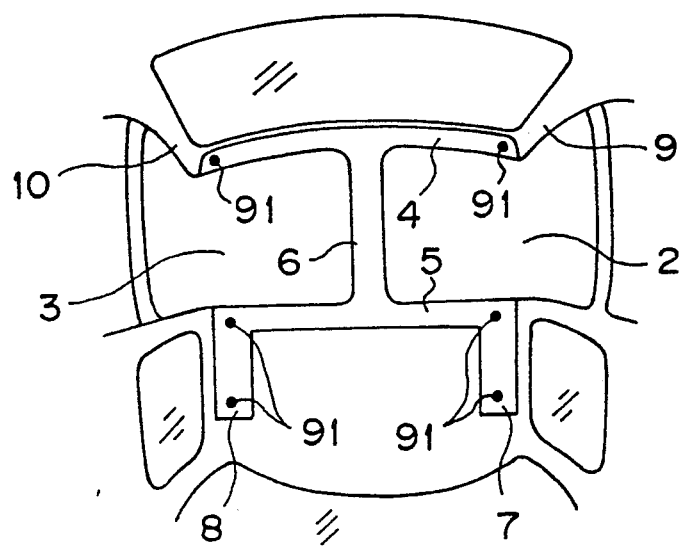
FIG. 14 is a schematic top view showing the relationship of positions of a first aligning portion or member disposed on the side of the body of the vehicle.
Figure 15:
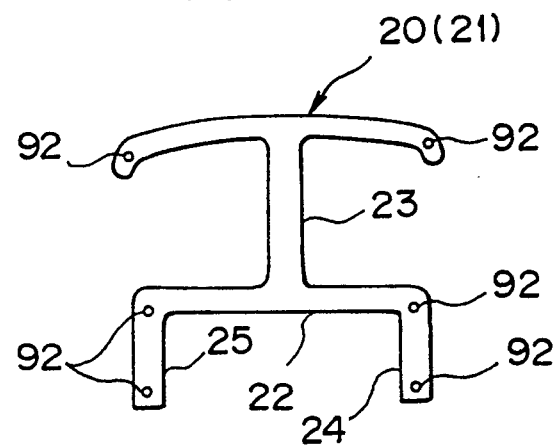
FIG. 15 is a top view showing the relationship of positions of a first aligning, portion or member disposed on the side of the base frame.

FIGS. 14 and 15 show an example in which a first aligning section or member 91 is formed on the side of the body of the vehicle and a second aligning section or member 92 is formed on the side of the base frame 20. The first aligning section or member 91 is so arranged as to be engaged with the second aligning section or member 92 when the base frame 20 is aligned with the body in a normally positional relationship. In order to allow the first aligning section or member 91 to be engaged with the second aligning section or member 92, one of the first or second aligning section or member 91 or 92 may be formed as a projection and the other may be formed as an aperture or a concave section so as to tightly fix the base frame 20 to the body.

Figure 18:
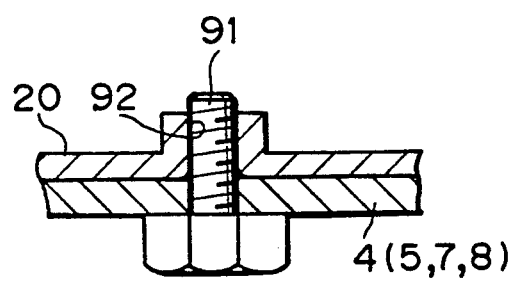
FIG. 18 is a cross-sectional side view showing an example of the first aligning portion or member and a second aligning portion or member, as shown in FIGS. 14 and 15.

The base frame 20 is fixed to the body after the first aligning section or member 91 has been engaged with the second aligning section or member 92. If the first aligning section or member 91 and/or the second aligning section or member 92 cause/causes any interference after the fixing of the base frame 20 to the body, they or it may be left underached as they are or as it is. If the first aligning section or member 91 and/or the second aligning section or member 92 are/is to be removed, the aligning section in the form of a projection may preferably be composed of a bolt in order to allow the bolt to be detached from the base frame 20 or the body after they have been fixed to each other. For example, as shown in FIG. 18, a bolt as the first aligning section or member 91 is mounted to the member 4, 5, 7 or 8 on the body side, on the one hand, and an engaging hole as the second aligning section or member 92 is formed so as to allow a threaded portion of the bolt to be screwed tightly therethrough, on the other hand. If the bolt should be detached from the body, the bolt is inserted from the bottom of the member on the body side, that is, from the side of a compartment of the vehicle. If the bolt may be left undetached, the bolt may be welded to the member on the body side.

Referring back to FIGS. 14 and 15, it is shown that the front base frame section 21 is aligned with the guide sections 23 and 24. It is to be noted, however, that the front base frame section 21 only may be aligned with the body without alignment of the other sections.

Further, the movable roof member 31 may be utilized in place of the first and second aligning sections or members 91 and 92 as shown in FIGS. 14 and 15. The movable roof member 31 is mounted in its closed state to the base frame 20 in advance, and the base frame 20 is aligned with the body of the vehicle so as for an outer peripheral edge of the movable roof member 31 in its closed state assumes a predetermined positional relationship with respect to the body. More specifically, when the movable roof member 31 is in the closed state as shown in FIG. 7, an upper surface of the movable roof member 31 is arranged so as to become flat on the same plane or at the same level as the surroundings on the body side. Hence, the movable roof member 31 is mounted to and assembled with the base frame 20 so as to assume this state and the base frame 20 is aligned with the body by taking advantage of the movable roof member 31, followed by fixing the base frame 20 with the body. The base frame 20 is fixed to the body from the compartment side.

In order to conveniently and accurately align the base frame 20 with the body by the aid of the movable roof member 31, the motor 57 is rotated so as to move the driving block 55 forward, thereby pressing the movable roof member 31 forcibly forward and downward.

In addition, the movable roof member 31 may be provided with a section or member corresponding to the second aligning section or member 92 which in turn may be engaged with the first aligning section or member 91 formed on the body side as shown in FIG. 14.

The coverings 32 and 33 for covering the guide sections 24 and 25, as shown in FIG. 1, are fixed to the rear roof panel section 1a after the base frame 20 has been secured to the body of the vehicle.

Figure 19:
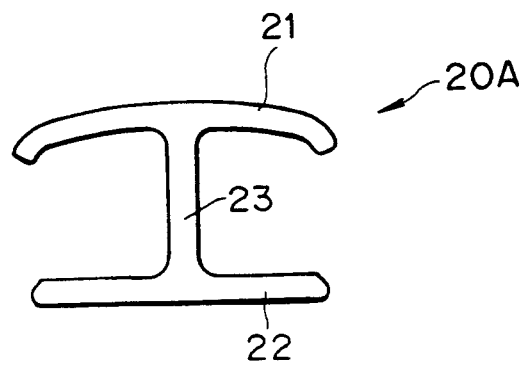
FIG. 19 is a top view showing another example of a base frame.
Figure 20:
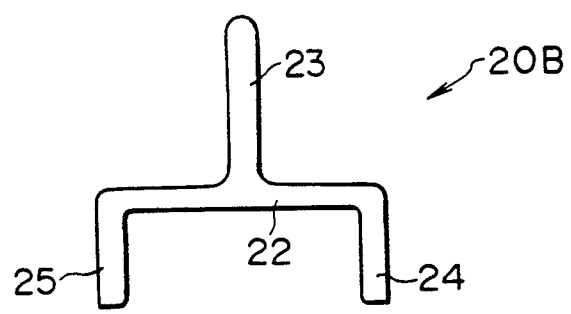
FIGS. 20 and 21 are top views showing examples of conventional base frames as indicated as comparison examples.
Figure 21:
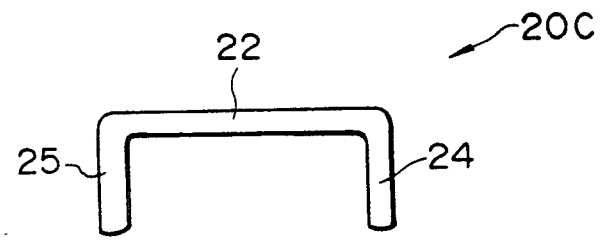

Turning now to FIGS. 19 to 21, the base frame 20A may be formed in such a shape as will be described hereinafter. As shown in FIG. 19, the base frame may be shaped in such a way that it comprises the front base frame section 21, the rear base frame section 22, and the connecting middle base frame section 23, with no portion corresponding to the left-hand and right-hand guide sections 24 and 25 provided. As shown in FIG. 20, although the base frame 20B may be arranged in such a shape that it comprises the rear base frame section 22, the middle base frame section 23, and the guide sections 24 and 25, with no portion corresponding to the front base frame section 21 provided. As shown in FIG. 21, the base frame 20C may be composed of the rear base frame section 22 and the left-hand and right-hand guide sections 24 and 25, with no portions corresponding to the front base frame section 21 and the middle base frame section 23 provided, these types of the base frames are not preferred in terms of fixing the base frame to the body tightly or ensuring a smooth movement of the movable roof member 31.

Figure 22:
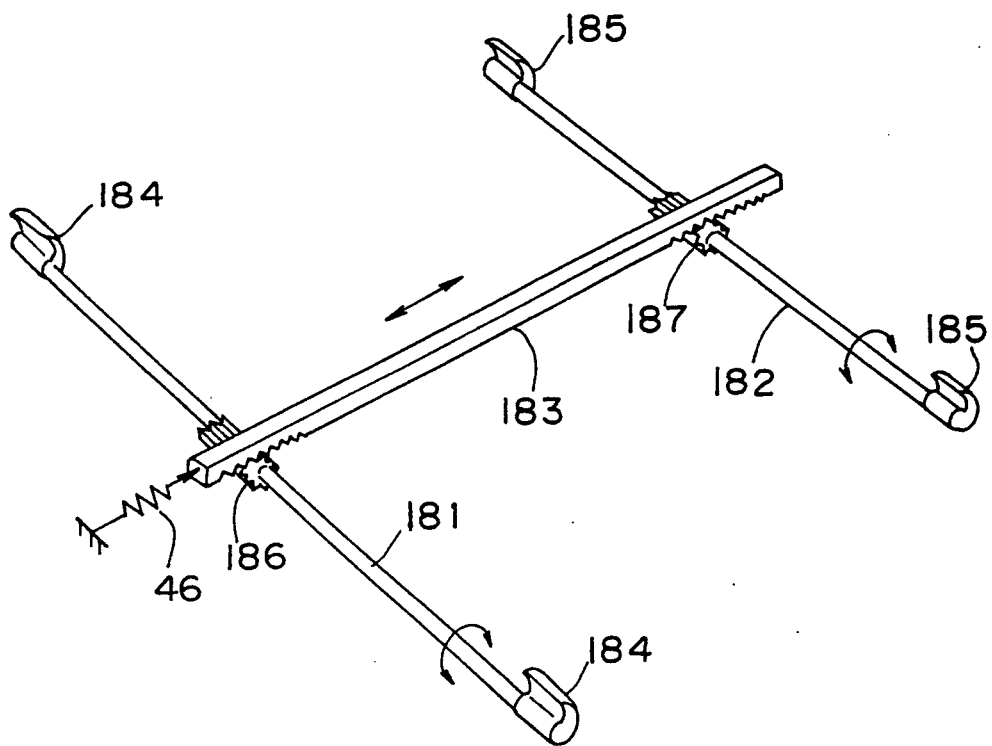
FIG. 22 is a perspective view showing an essential portion of a shutting mechanism.
Figure 23:
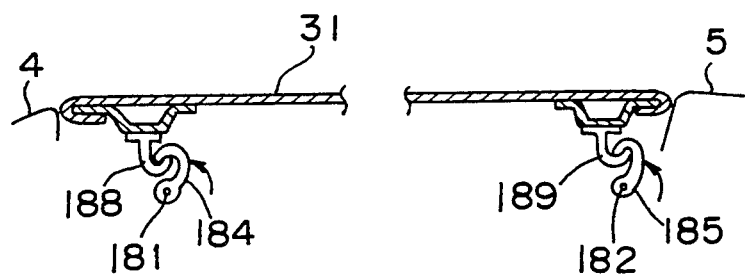
FIG. 23 is a cross-sectional side view showing the essential portion of the shutting mechanism in its operative state.

FIGS. 22 and 23 shows another embodiment of the shutting mechanism. In this embodiment, the members corresponding to the levers 44 and 45 as shown in FIG. 6 are replaced with shafts 181 and 182, respectively, each of which is held with the base frame 20 so as to be pivotable about a rack bar 183 corresponding to the connecting rod 46. To the shafts 181 and 182 are mounted hooks 184 and 185 corresponding to the engaging paws 49 and 50, respectively. Like the connecting rod 46 as shown in FIG. 6, the rack bar 183 is arranged to be operatively moved in forward and rearward directions, as indicated by the arrow in FIG. 22, via the stop block 51 and the driving block 55 with the motor 57 of FIGS. 6–8. The shafts 181 and 182 are provided halfway with pinions 186 and 187, respectively, so as to be meshable with toothed portions formed at the corresponding portions on the bottom surfaces of the rack bar 183.

In FIG. 23, a pair of left-hand and right-hand hooks 188 are integrally formed on the bottom surface at the front end portion of the movable roof member 31, and a pair of left-hand and right-hand hooks 189 are likewise formed integrally on the bottom surface at the rear end portion of the movable roof member 31. The hooks 188 and 189 are so arranged as to be hooked with the respective hooks 184 and 185 mounted to the respective shafts 181 and 182.

The arrangement described above allows the rack bar 183 to move forward immediately before the movable roof member 31 has been closed, when the movable roof member 31 is operated toward closing, thereby starting a pivotal movement of the hooks 184 and 185. As the movable roof member 31 has been closed to a full extent, the hook 184 is engaged with the hook 188 mounted to the movable roof member 31 and the hook 185 is engaged with the hook 189 of the movable roof member 31, as shown in FIG. 23. The engagement with the hooks can ensure a tight and integral connection of the movable roof member 31 in its closed state to the body of the vehicle.

The engagement of the movable roof member 31 with the body can be maintained as long as no force for releasing the engagement is applied to the hooks 184 and 185, so that it is unnecessary to constantly apply any force to maintain the engagement of the movable roof member 31 with the body.

The engagement of the movable roof member 31 with the body through the hooks can be released when the movable roof member 31 is operatively opened from its closed state in the manner as described with reference to FIGS. 7 and 8.

Figure 24:
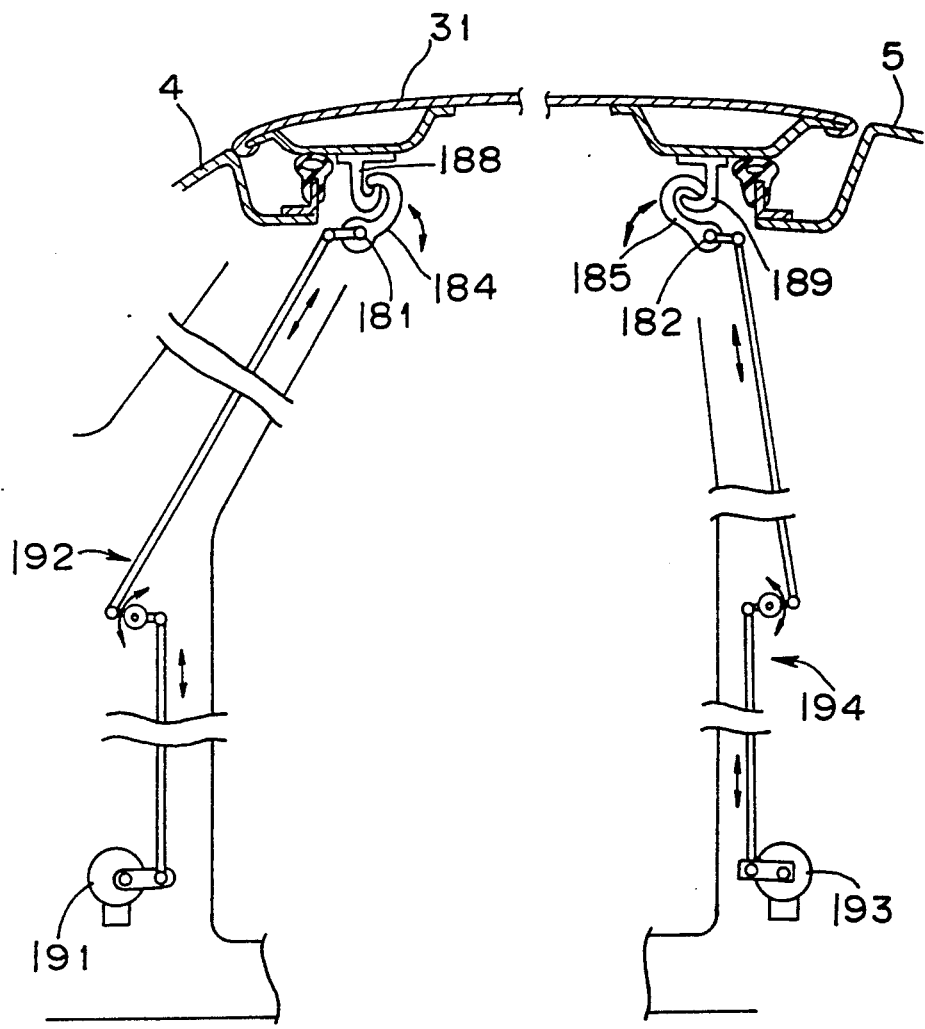
FIG. 24 is a schematic side view showing another example of the shutting mechanism.

FIG. 24 shows an example in which the hooks 184 and 185 are engaged with and disengaged from the hooks 188 and 189, as shown in FIGS. 22 and 23, respectively, by taking advantage of a motor disposed for exclusive use, mounted independently from the motor 57 for opening and closing the movable roof member 31. In this example, the rack bar 183 as shown in FIG. 22 is not provided.

More specifically, a first motor 191 is disposed within the body below the front pillar, so as to allow the shaft 181 for the hooks 184 to pivot through a first link mechanism 192 disposed within the body, thereby allowing the hooks 184 to pivot on the shaft 181 with the hooks 184 mounted thereon. Likewise, a second motor 193 is disposed within the body underneath the rear pillar, and the shaft 182 for the hooks 185 is allowed to pivot through a second link mechanism disposed within the body, thereby engaging the hooks 185 with the hooks 189.

The first and second motors 191 and 193 are so arranged as to be operated at a predetermined timing with respect to the operation of the motor 57 for opening and closing the movable roof member 31. After the movable roof member 31 is closed by the operation of the motor 57, the first and second motors 191 and 193 are operated to thereby engage the hooks 184 and 185 with the hooks 188 and 189, respectively. On the other hand, the movable roof member 31 is opened from its closed state by operating the first and second motors 191 and 193 to release the engagement of the hooks 184 and 185 with the respective hooks 188 and 189, followed by operating the motor 57 to open the movable roof member 31.

If the rack bar 183 as shown in FIG. 22 is employed, either one of the first or second motor 191 or 193 may be omitted.

Figure 25:
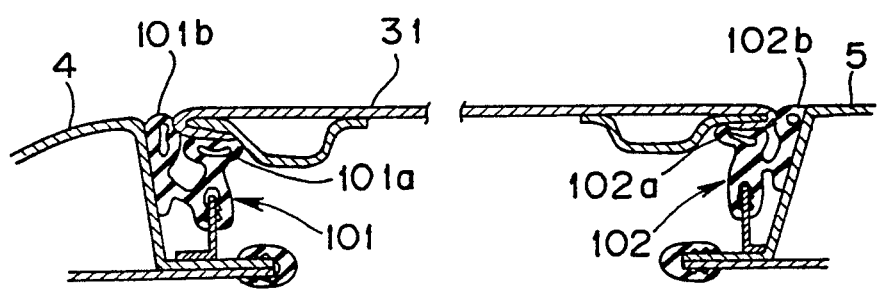
FIG. 25 is a cross-sectional side view showing an essential portion of a preferred example in which a gap between the front header and the movable roof member is sealed with a sealing member.

FIG. 25 shows the positions in which gaps formed between the movable roof member 31 and the body are sealed with sealing members. When the movable roof member 31 is closed, the gap between the front header 4 and the movable roof member 31 is sealed with a front sealing member 101 and the gap between the front edge portion 5 of the rear roof panel section 1a and the movable roof member 31 is sealed with a rear sealing member 102. Each of the sealing members 101 and 102 is so adapted as to extend transversely over the substantially entire length of the respective sides of the movable roof member 31. The front sealing member 101 is mounted to the front header 4 in a position below the movable roof member 31, and the rear sealing member 102 is mounted to the front edge portion 5 of the rear roof panel section 1a underneath the movable roof member 31.

The front sealing member 101 comprises a first front sealing member section 101a and a second front sealing member section 101b. The first front sealing member section 101a is so arranged as to come into abutment with a portion of the bottom surface of the movable roof member 31 in the closed state, which extends in a substantially horizontal direction and to seal the gap between the front header 4 and the movable roof member 31. On the other hand, the second front sealing member section 101b is so arranged as to close and seal the gap formed between the front header 4 and the front end of the movable roof member 31 when the movable roof member 31 is closed.

Likewise, the rear sealing member 102 is composed of a first rear sealing member section 102a and a second rear sealing member section 102b. The first rear sealing member section 102a is so arranged as to come into abutment with a portion of the bottom surface of the movable roof member 31 in the closed state, which extends in a substantially horizontal direction and to seal the gap between the front header 4 and the movable roof member 31. On the other hand, the second rear sealing member section 102b is so arranged as to close and seal the gap formed between the front header 4 and the rear end of the movable roof member 31 when the movable roof member 31 is closed.

The movable roof member 31 is sealed at its front and rear portions with the sealing members in a double manner, so that good sealing performance can be ensured. Particularly, as the first front and rear sealing member sections 101a and 102a are disposed in abutment with the substantially horizontal surfaces of the movable roof member 31, this abutment can be sustained and good sealing performance can be ensured, even if the movable roof member 31 would be displaced and deviate from the front header 4 or the front edge portion 5 of the rear roof panel section 1a to a considerably large extent relatively in a forward or rearward direction and a seal with the second front and rear sealing member section 101b or 102b would be impaired.

Figure 26:
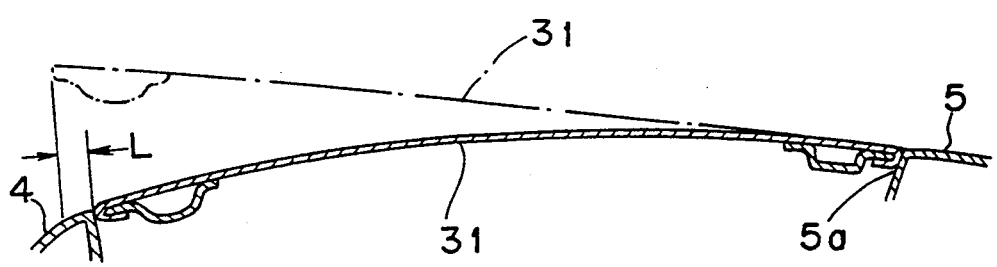
FIG. 26 is a cross-sectional side view showing an essential portion of an example in which the movable roof member is so structured as to be extendable or retractable in a forward or rearward direction.

FIG. 26 shows an example in which the movable roof member 31 is so arranged as to be expandable or retractible in a forward or rearward direction by taking advantage of its elasticity. The movable roof member 31 in its free state is so adapted as to be somewhat longer by the length L than the longitudinal length of each of the roof opening sections 2 and 3, that is, the distance between the front header 4 and the front edge portion 5 of the rear roof panel section 1a. Hence, when it is brought into its closed state, the movable roof member 31 is made expanded to some extent due to elastic transformation. When the front header 4 is caused to displace forward in the state in which the movable roof member 31 is closed, the movable roof member 31 is caused to expand or retract longitudinally following the displacement of the front header 4, thereby ensuring a good sealed state around the movable roof member 31 in its closed state. More specifically, even if the gaps formed between the movable roof member 31 and the body are sealed only with the second front and rear sealing member sections 101b and 102b as shown in FIG. 25, the sealing performance gained with the second front and rear sealing member sections 101b and 102b can always be ensured.

In FIG. 26, when the tilted-up movable roof member 31 is to be brought into the closed state, it is preferred to provide the front edge portion 5 of the rear roof panel section 1a with a sloping surface 5a in a position in which the rear end of the movable roof member 31 is adapted to the front edge portion 5 of the rear roof panel section 1a. The sloping surface 5a is so arranged as to deviate its edge position toward the rear as the movable roof member 31 is moved upward.

Further, the movable roof member 31 may comprise a front portion and a rear portion, which may be arranged to be joined to each other so as to be slidable in a longitudinal direction and to expand in the longitudinal direction with the aid of a spring.

FIGS. 27 to 32 show examples in which the front pillar 10 is aligned with the movable roof member 31 always in a predetermined position with the aid of a side door. The same alignment is applicable to pillar 9. A description which follows is directed to the left-hand side of the body of the vehicle because the left-hand and right-hand sides of the body is substantially the same.

Figure 27:
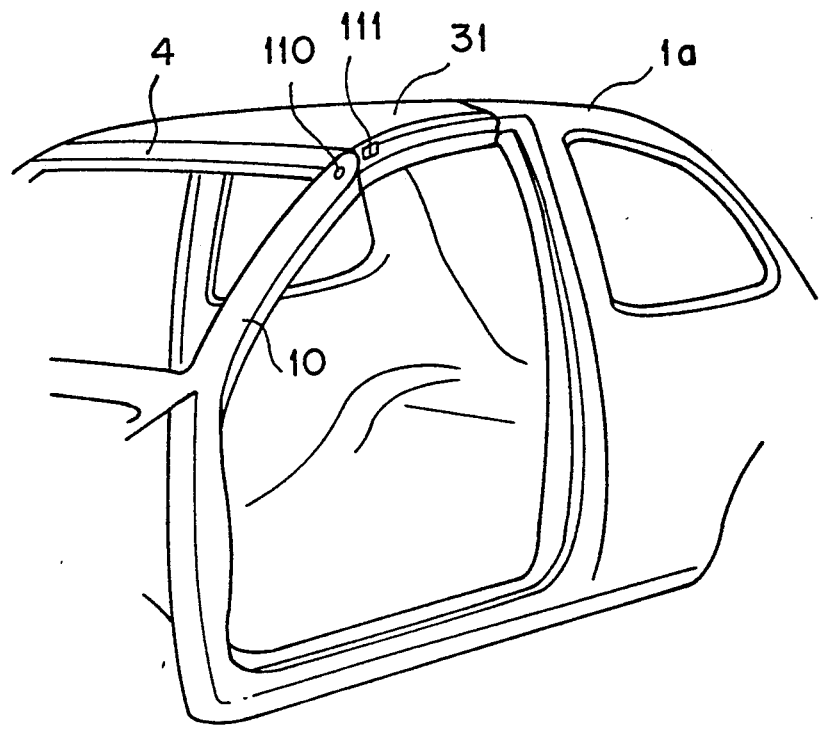
FIG. 27 is a perspective view showing engaging holes mounted in a front pillar and the movable roof member, with a side door detached from the body of the vehicle.
Figure 28:
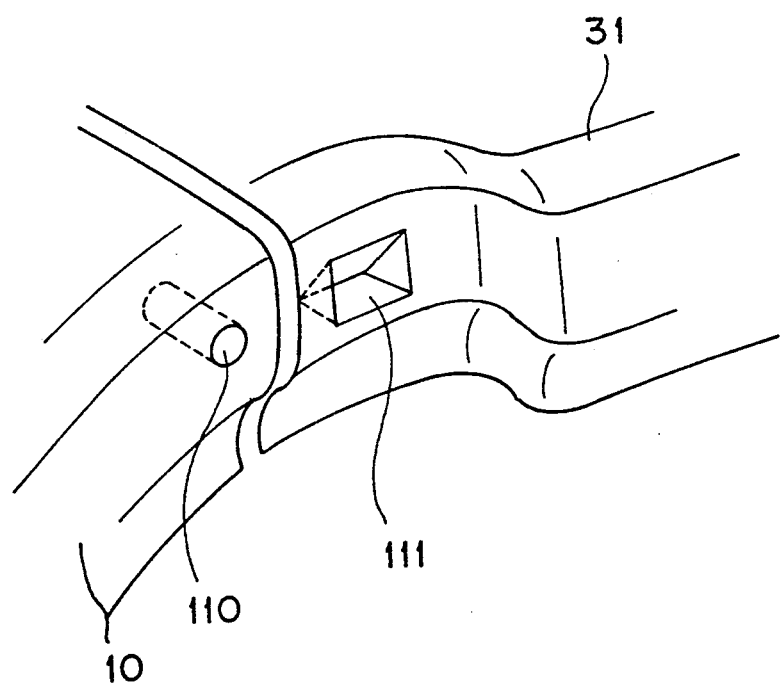
FIG. 28 is an enlarged perspective view showing an essential portion of FIG. 27.
Figure 29:
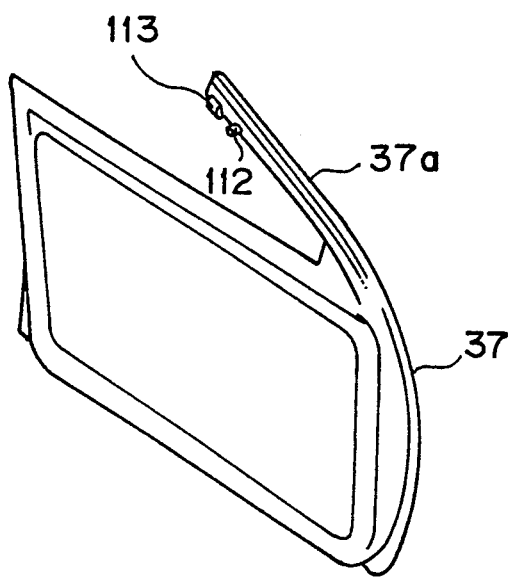
FIG. 29 is a perspective view showing an engaging projection formed on an inner surface of a pillar section of the side door.

Referring to FIGS. 27 and 28, an engaging hole 110 is formed in the outer side surface at the upper end portion of the front pillar 10, and an engaging hole 111 is formed in the outer side surface at the front end portion of the movable roof member 31.

On the other hand, as shown in FIGS. 29 to 32, a side door 37 is provided with a pillar section 37a which is arranged to extend from an upper front end of the side door 37 in an obliquely rearward direction and which is so arranged as to level or become flat on the same plane as the front pillar 10 of the body when the side door 37 is closed. On the inner surface at the upper end portion of the pillar section 37a are formed two engaging projections 112 and 113 which in turn are engaged with the engaging holes 110 and 111, respectively.

Figure 32:
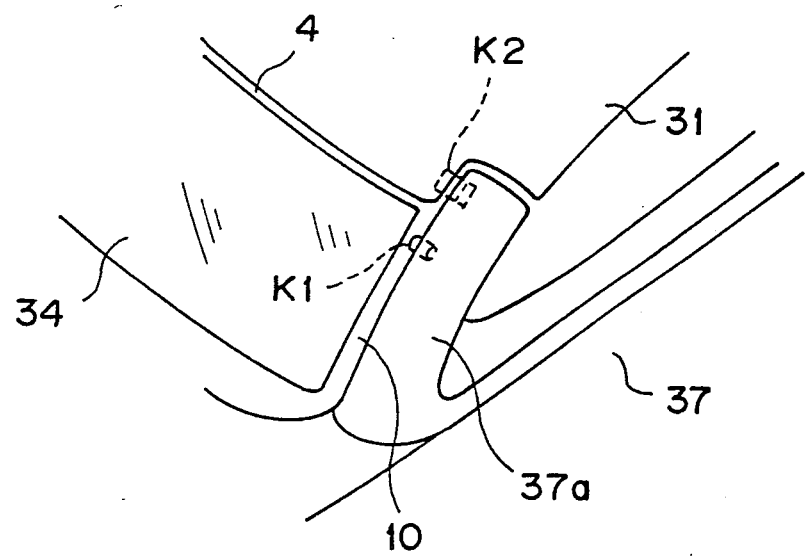
FIG. 32 is a perspective view showing a state in which the engaging hole as shown in FIG. 28 is engaged with the engaging projection as shown in FIG. 30.

As specifically shown in FIG. 32, the engaging hole 110 and the corresponding engaging projection 112 constitute a first engagement section K1, and the engaging hole 111 and the corresponding engaging projection 113 constitute a second engagement section K2.

The engaging hole 110 of the first engagement section K1 is formed in a circular shape in section, and the corresponding engaging projection 112 is formed in a circular shape in section so as to be inserted into and tightly engaged with the engaging hole 110.

Figure 31:
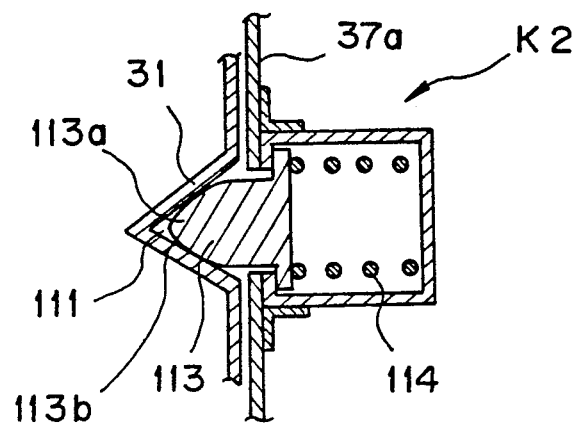
FIG. 31 is an enlarged cross-sectional side view showing a state in which the engaging hole formed in the movable roof member is engaged with the engaging projection formed on the pillar section of the side door.

On the other hand, as shown in FIG. 31, the engaging hole 111 of the second engagement section K2 is formed in such a rectangular shape in section that its cross-sectional area becomes smaller as its depth becomes deeper, and the corresponding engaging projection 113 is formed in such a rectangular shape in section that its sectional area becomes smaller as its depth becomes deeper, thereby allowing the engaging projection 113 to be inserted into and tightly engaged with the engaging hole 111. More specifically, the upper and lower surfaces of the engaging projection 113 are comprised of tapered surfaces 113a and 113b; the upper inclined surface 113a is so formed as to be inclined downward as the depth of the projection becomes deeper, while the lower inclined surface 113b is so formed as to be inclined upward as the depth thereof becomes deeper. This arrangement for the downward and upward tapered surfaces 113a and 113b allows the engaging projection 113 to be tightly engaged with the engaging hole 111.

Figure 30:
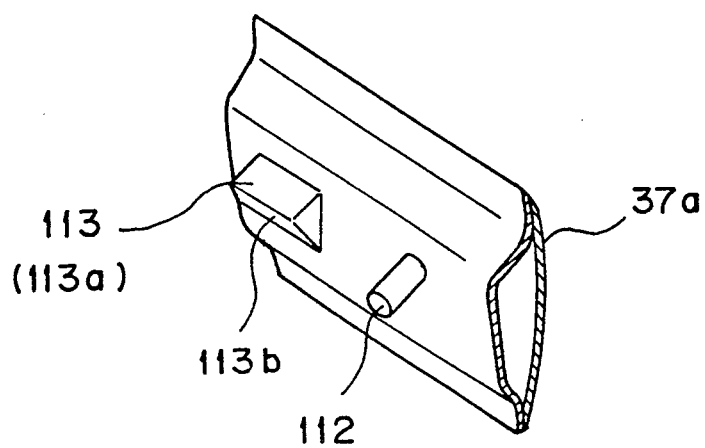
FIG. 30 is an enlarged perspective view showing an essential portion of FIG. 29.

FIG. 30 shows the engaging projection 112 of the first engagement section K1 is fixed to the pillar section 37a so as to be unmovable. The engaging projection 113 of the second engagement section K2 is so biased with a spring 114 as to be projectable from the inside of the pillar section 37a, as shown in FIG. 31.

A description will now be made of the state in which the movable roof member 31 is closed and the side door 37 is closed. With the arrangement for the engagement as have been described hereinabove, the first engagement section K1 is brought in an engaged state by inserting the engaging projection 112 into the engaging hole 110, and the second engagement section K2 is brought in an engaged state by inserting the engaging projection 113 into the engaging hole 111. These states are indicated in FIG. 32.

The movable roof member 31 is integrally fixed to the front header 4 in the longitudinal direction through the pillar section 37a when the two engagement sections K1 and K2 are brought in the engaged states, thereby ensuring good sealing performance around the movable roof member 31 in its closed state.

When it is begun being tilted up from its closed state, the movable roof member 31 which is about to move upward is brought into abutment with the inclined surface 113b of the engaging projection 113 and the projection 113 is detached from the engaging hole 111. The projection 113 does not suppress the movable roof member 31 from being tilted up.

On the other hand, when it is begun being closed from its tilted-up state, the movable roof member 31 which is about to move downward is brought into abutment with the inclined surface 113a of the engaged projection 113, and the engaged projection 113 is allowed to be detached. The projection 113 does not suppress the movable roof member 31 from being closed.

Either of the first engagement section K1 or the second engagement section K2 may be provided. The first engagement section K1 can suppress an undesirable forward or rearward movement of the front header 4 from occurring. On the other hand, the provision of the second engagement section K2 can assist fixing the movable roof member 31 in its closed state integrally with the body of the vehicle through the side doors 36 and 37 and suppress a large extent of a relatively forward or rearward displacement of the front header 4 with respect to the movable roof member 31.

An edge portion of the opening of each of the engaging holes 110 and 111 may be expanded in a longitudinal direction or a longitudinally top end portion of each of the engaging holes 110 and 111 may be narrowed, so as to allow the respective projections 112 and 113 in order to be inserted into or detached from the holes 110 and 111 smoothly, in accordance with the opening or the closing of the side door 37. This arrangement serves as preventing the projections 112 and 113 from interfering with the edges of the openings of the engaging holes 110 and 111.

Figure 33:
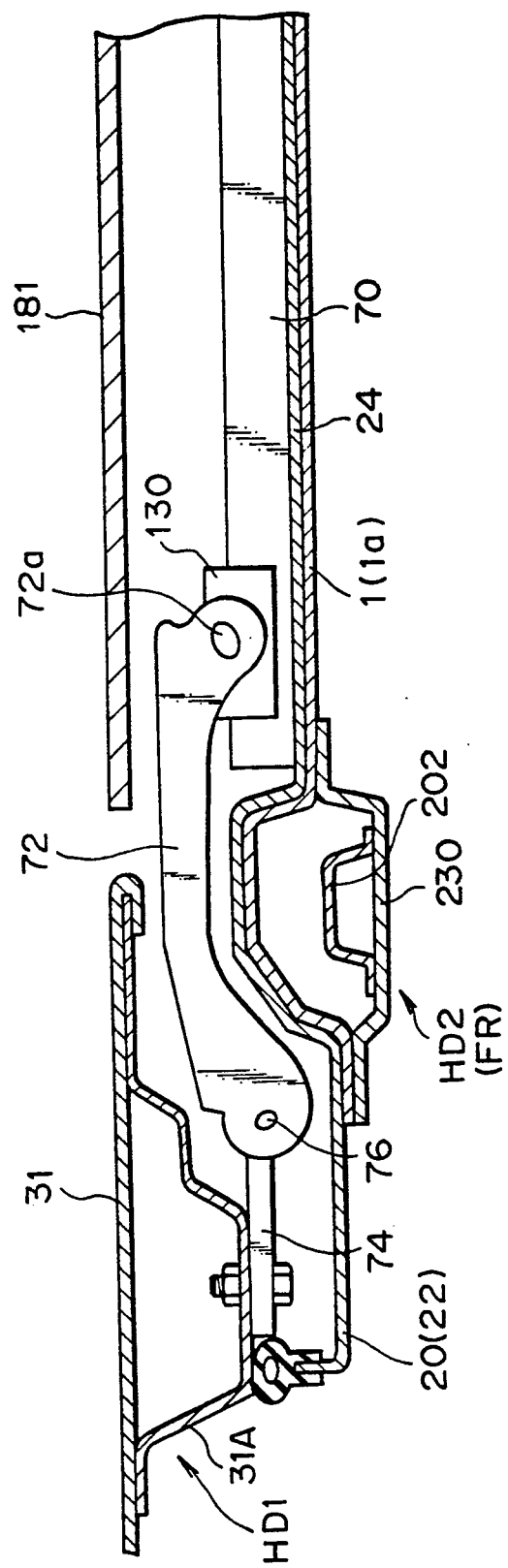
FIG. 33 is a cross-sectional side view showing a preferred positional relationship between the movable roof member, a guide rail, and a frame body.
Figure 34:
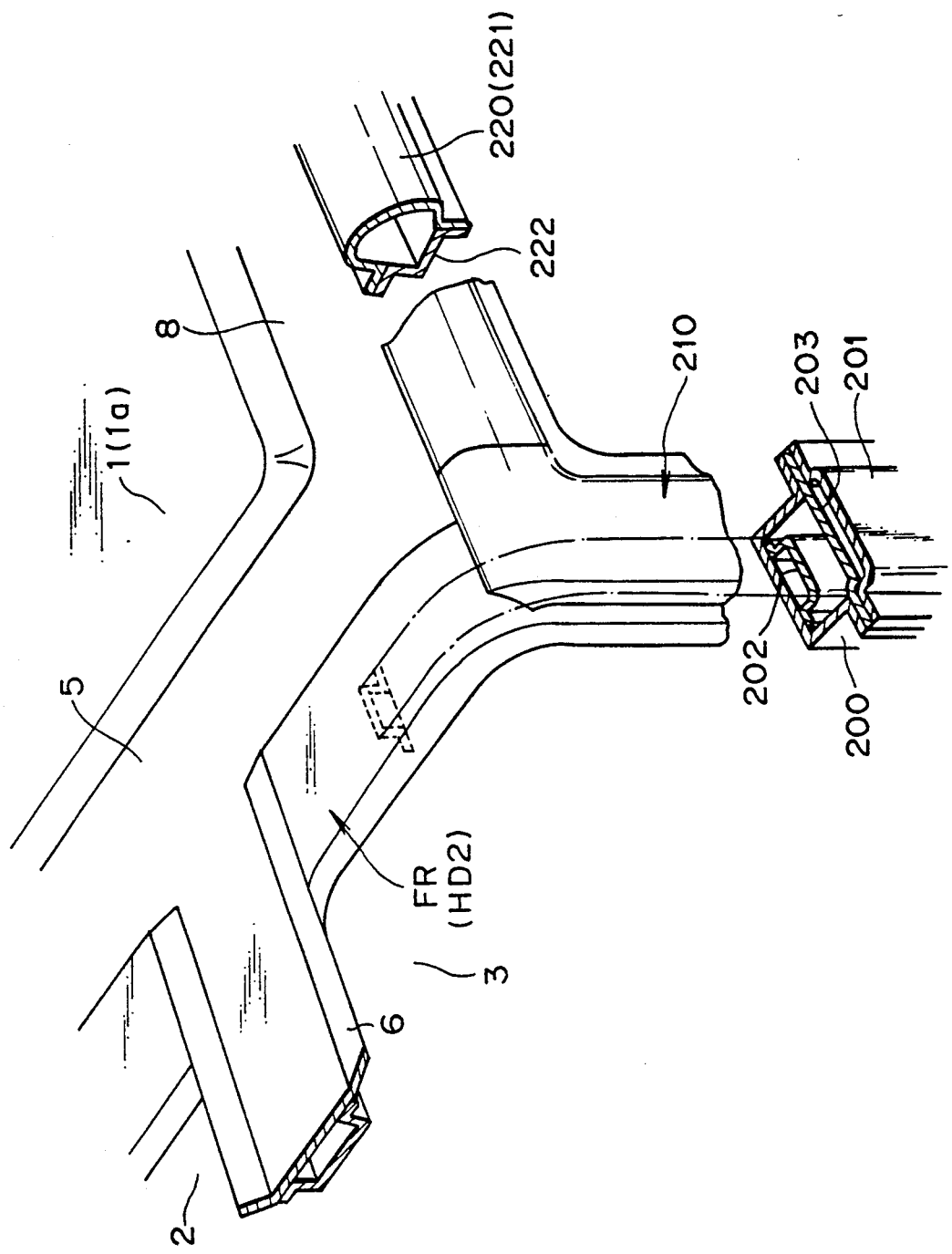
FIG. 34 is a partially sectional perspective view showing the structure of the body at a portion immediately behind the roof opening as shown in FIG. 33.

FIGS. 33 and 34 shows a preferred example of the structure of a portion of the body of the vehicle in the vicinity of a portion immediately behind the roof opening section.

The movable roof member 31 has a closed structure in section over its entire peripheral portion by joining an inner panel 31A to a peripheral bottom edge portion of the movable roof member 31. The closed section of the rear end portion of the movable roof member 31 is referred to herein as a first closed section as indicated by reference symbol HD1.

On the other hand, a front end portion of the rear roof panel section 1a is provided with a second closed section, as indicated by reference symbol HD2, which is so arranged as to extend in the transverse direction of the body in a manner as will be described hereinafter and which is located between the first closed section HD1 and the guide frame 70.

In FIG. 34, a center pillar 210 is located immediately behind the side doors 36 and 37. The center pillar 210 has a closed section which is comprised of an inner panel 200 and an outer panel 201, reinforced with a first reinforcement member 202 and a second reinforcement member 203, thereby enhancing rigidity to an extremely high extent.

The second closed section HD2 comprises a frame body FR extending transversely, and a bottom surface of the frame body FR is composed of an inner panel 230 attached to the bottom surface of the rear roof panel section 1a, as shown in FIG. 33. The inner panel 230 is connected to the inner panel 200 of the center pillar 210, and the frame body FR has an extension of the first reinforcement member 202 of the center pillar 210 disposed within it.

The frame body FR has a closed section formed by the rear roof panel section 1a and the inner panel 230 and, further, a double closed section formed by the first reinforcement member 202, thereby providing an extremely high extent of rigidity as a whole. In FIG. 33, reference numeral 130 denotes a slider to be Guided slidably by the guide frame 70, and the lever 72 is connected with the slider 130 so as to be pivotable about the pin 72a.

As shown in FIG. 34, a roof side rail 220 extending longitudinally is provided at transversely outer end portions of the rear roof panel section 1a and it has a closed section formed by an inner panel 222 and an outer panel 221. An front end portion of the roof side rail 220 is attached to the frame body FR and the center pillar 210. More specifically, the transversely inner end portion of the roof side rail 220 is connected to the frame body FR and the transversely outer end portion thereof is connected to the center pillar 210.

The front end portion of the rear roof panel section 1a constituting the rear edge portions of the roof opening sections 2 and 3 is composed of a kind of a roll bar formed by the frame body FR and the center pillar, so that rigidity can be enhanced to a remarkably high extent. To the member constituting the roll bar is connected the roof side rail 220 extending longitudinally, so that rigidity can further be enhanced.

An accurate alignment between the left-hand and right-hand guide frames 70 and 71 may be made by connecting the left-hand guide frame 70 with the right-hand guide frame 71 through a cover panel 181 which in turn is disposed so as to cover a large majority of the rear roof panel section 1a from the top, as shown in FIG. 33.

Figure 36:
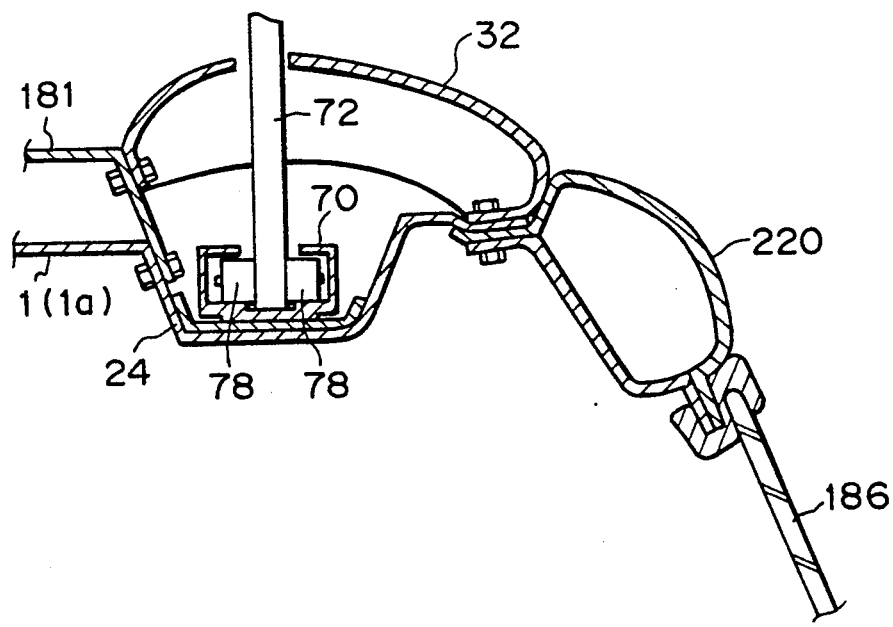
FIG. 36 is a cross-sectional side view showing a portion in the vicinity of a side end portion of the cover panel.

FIG. 36 shows a state in which the cover panel 181 is connected to the Guide frame 70. The same thing can be said of the connection of the cover panel 181 to the guide frame 72. In FIG. 36, reference numeral 186 denotes a quarter window panel and the lever 72 is of a type as being guided with respect to the guide frame 70 through a roller 78.

Figure 35:
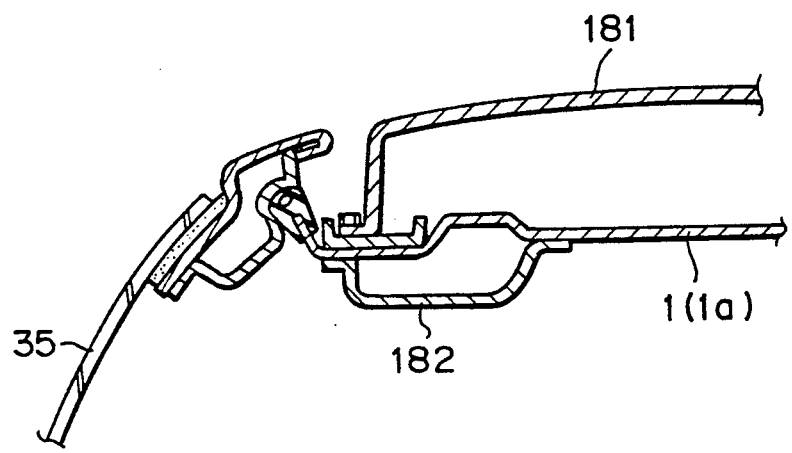
FIG. 35 is a cross-sectional side view showing a portion in the vicinity of a rear end portion of a cover panel.

In addition, as shown in FIG. 35, a rear end portion of the cover panel 181 is secured to a rear header 182. The cover panel 181 is so adapted as to cover an upper portion of the motor 57 and to be flat on the same plane as the upper surface of the movable roof member 31, thereby providing a good outlook.

Furthermore, the left-hand guide frame 70 may be aligned with the right-hand guide frame 71 with high accuracy by connecting a rear end portion of the left-hand guide section 24 of the base frame 20 to a rear end portion of the right-hand guide section 25 through a connecting member corresponding to the aligning jig 86 as shown in FIG. 12.

Figure 37:
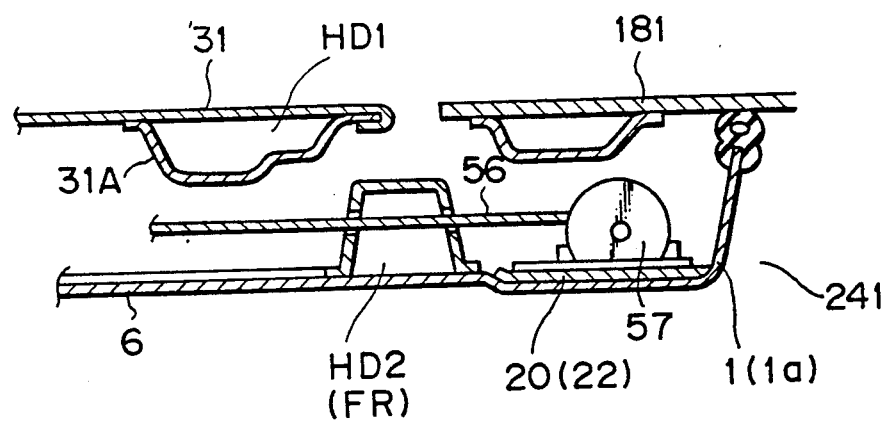
FIG. 37 is a cross-sectional side view showing another embodiment of the present invention, in which a motor for opening and closing the movable roof member and the frame body.

As it is considered that the frame body FR constituting the second closed section may interfere with the driving wire 56 extending from the motor 57, the driving wire 56 may be disposed so as to penetrate through the frame body FR, for example, as shown in FIG. 37. This arrangement can avoid the disposition of the wire 56 around the frame body FR, thereby saving a space.

Further, as shown in FIG. 37, the motor 57 may be mounted on the upper surface of the base frame 20, and the frame body FR may be of a single closed section. In addition, an opening 241 may be provided in a central portion of the rear roof panel section 1a and the opening 241 may be covered with the cover panel 181, in order to allow the cover panel 181 to function substantially as a roof panel.

The present invention is not intended in any manner to be limited to the embodiments as described hereinabove, and it is to be understood that any variations or modifications made so as not to deviate from the basic concepts of the present invention are interpreted as being contained within the spirit and the scope of the present invention.

What is claimed is:

1. A method for the assembly of a sun roof for an automotive vehicle, wherein the sunroof comprises (1) a pair of left-hand and right-hand roof opening sections each at a front portion of a roof panel, wherein the openings each form an open-side transversing the roof panel, and wherein the openings each form a closed-side at a front side, a rear side, and a longitudinally inner side; (2) a movable roof member large enough to substantially cover the pair of the left-hand and right-hand roof opening sections, wherein the movable roof member moves longitudinally through a base frame fixed to a body of the vehicle, and wherein the movable roof member simultaneously opens and closes the left-hand and right-hand roof opening sections; and (3) said base frame comprises (a) a front base frame section extending transversely over substantially the entire length of and along a front header constituting a front edge portion of the roof opening sections, (b) a rear base frame section extending transversely over substantially the entire length of and along a front edge portion of a rear roof panel section; and (c) a middle base frame section extending longitudinally and connecting a middle portion of said front base frame section and a middle portion of the rear base frame section;

wherein the method for assembly comprises the steps of:

connecting a transversely outer side portion of said front header to said front edge portion of the rear roof panel section or connecting a transversely outer side portion of said front base frame section of the base frame to said rear base frame section with at least one aligning jib;

fixing said base frame to said body so that the transversely outer side portion of said front header is connected to said front edge portion of the rear roof panel section with said at least one aligning jig or the transversely outer side portion of said front base frame section of the base frame is connected to said rear base frame section thereof with said at least one aligning jig; and (3) releasing said at least one aligning jig after said base frame has been fixed to said body.

2. A method for the assembly of a sun roof as claimed in claim 1, wherein the connecting step comprises:
connecting a left-hand outer side portion of said front header to a left-hand outer side portion of said front edge portion of the rear roof panel section with a left-hand aligning jig; and
connecting a right-hand outer side portion of said front header to a right-hand outer side portion of said rear roof panel section with a right-hand aligning jig.

3. A method for the assembly of a sun roof as claimed in claim 1, wherein said connecting step comprises:
connecting a left-hand outer side portion of said front base frame section to a left-hand outer side portion of said front base frame section with a left-hand aligning jig; and
connecting a right-hand outer side portion of said front base frame section to a right-hand outer side portion of said rear base frame section with a right-hand aligning jig.

4. A method for the assembly of a sun roof as claimed in claim 2, wherein said base frame further comprises (d) a left-hand guide section extending rearward from the left-hand outer side portion and a right-hand guide section extending rearward from the right-hand outer side portion.

5. A method for the assembly of a sun roof as claimed in claim 4, wherein said connecting steps comprise:
connecting one sheet of an aligning jig in the form of a plate to at least (i) said left-hand and right-hand outer side portions of the front base frame section, (ii) said rear base frame section, and (iii) said left-hand and right-hand end portions of said guide sections.

6. A method for the assembly of a sun roof as claimed in claim 5, wherein said plate form aligning jig is larger than all peripheral edge portions of said base frame and said plate form aligning jig is connected to said base frame.

7. A method for the assembly of a sun roof as claimed in claim 2, wherein said at least one aligning jig in step is said movable roof member.

8. A method for the assembly of a sun roof as claimed in any one of claims 2 to 7, wherein said at least one aligning jig is connected to said body or said base frame with a detachable fixing member.

9. A method for the assembly of a run roof as claimed in claim 8, wherein said fixing member comprises a bolt and a nut.

10. A method for the assembly of a sun roof for an automotive vehicle, wherein the sunroof comprises (1) a pair of left-hand and right-hand roof opening sections each at a front portion of a roof panel, wherein the openings each form an open-side transversing the roof panel, and wherein the openings each form a closed-side at a front side, a rear side, and a longitudinally inner side; (2) a movable roof member large enough to substantially cover the pair of the left-hand and right-hand roof opening sections, wherein the movable roof ember moves longitudinally through a base frame fixed to a body of the vehicle, and wherein the movable roof member simultaneously opens and closes the left-hand and right-hand roof opening sections; and (3) said base frame comprises (a) a front base frame section extending transversely over substantially the entire length of and along a front header constituting a front edge portion of the roof opening sections; (b) a rear base frame section extending transversely over substantially the entire length of and along a front edge portion of a rear roof panel section; and (c) a middle base frame section extending longitudinally and connecting a middle portion of said front base frame section and a middle portion of the rear base frame section;
wherein the method for assembly comprises the steps of:
forming a first alignment member at transversely outer side portions of said front header and at transversely outer side portions of said front edge portion of the rear roof panel section;
forming a second alignment member on said base frame in a position so that said second alignment member is engageable with said first alignment member; and
(3) fixing said base frame to said body so that said first alignment member is engaged with said second alignment member.

11. A method for the assembly of a sun roof as claimed in claim 10, further comprising:
temporarily mounting said movable roof member to said base frame;
forming said second alignment member on said movable roof member; and
aligning said base frame with said body through said movable roof member.

12. A method for the assembly of a sun roof as claimed in claim 11, wherein the sunroof further comprises (4) a shutting mechanism between said base frame and said movable roof member so as to press said movable roof member forward and downward when said movable roof section closes said roof opening sections, and
wherein said step of temporarily mounting said movable roof member to said base frame is accomplished with said shutting mechanism.

13. A method for the assembly of a sun roof as claimed in claim 12, wherein said shutting mechanism comprises a forward shutting mechanism and a rearward shutting mechanism, and
wherein said step of temporarily mounting said movable roof member to said base frame is accomplished with said forward and rearward shutting mechanisms.

14. A method for the assembly of a sun roof as claimed in claim 13, wherein said forward shutting mechanism is associated with said rearward shutting mechanism with a connecting member, and
wherein said step of temporarily mounting said movable roof member to said base frame is accomplished with said connecting member and said forward and rearward shutting mechanisms.

15. A method for the assembly of a sun roof as claimed in claim 10, wherein at least one of said first alignment member and of said second alignment member is in the form of a projection and the other alignment member is concave so as to be engageable with said projection.

16. A method for the assembly of a sun roof as claimed in claim 10, wherein said base frame further comprises (d) a left-hand guide section extending rearward from a left-hand outer side portion and a right-hand guide section extending rearward from a right-hand outer side portion;
wherein an end portion of said left-hand and right-hand guide sections is provided with another second alignment member; and
wherein said body is provided with another first alignment member so as to be engageable with said another second alignment member.

* * * * *